(12) United States Patent
Takeuchi et al.

(10) Patent No.: US 7,479,722 B2
(45) Date of Patent: Jan. 20, 2009

(54) RELATIVE DRIVE DEVICE

(75) Inventors: Kesatoshi Takeuchi, Nagano (JP); Takashi Kenjo, 3-5, Owa 3-chome, Suwa, Nagano (JP) 392-8502; Kobufuji Kaji, Saitama (JP)

(73) Assignees: Seiko Epson Corporation (JP); Takashi Kenjo (JP); Nobufuji Kaji (JP)

( * ) Notice: Subject to any disclaimer, the term of this patent is extended or adjusted under 35 U.S.C. 154(b) by 407 days.

(21) Appl. No.: 11/130,693

(22) Filed: May 17, 2005

(65) Prior Publication Data

US 2005/0275359 A1    Dec. 15, 2005

(30) Foreign Application Priority Data

May 18, 2004    (JP)    ............... 2004-147130

(51) Int. Cl.
    *H02K 47/04*    (2006.01)
(52) U.S. Cl. ................... 310/113; 310/156.35
(58) Field of Classification Search ........... 310/156.32, 310/156.35, 112–114, 266, 268
See application file for complete search history.

(56) References Cited

U.S. PATENT DOCUMENTS

| | | | | |
|---|---|---|---|---|
| 1,522,742 A | * | 1/1925 | Parvin | .................. 310/112 |
| 4,080,544 A | * | 3/1978 | Aoki | ..................... 310/268 |
| 4,371,801 A | * | 2/1983 | Richter | ................. 310/156.36 |
| 5,744,895 A | * | 4/1998 | Seguchi et al. | ............. 310/266 |
| 5,982,074 A | * | 11/1999 | Smith et al. | ................ 310/261 |
| 6,404,086 B1 | | 6/2002 | Fukasaku et al. | |
| 6,472,845 B2 | * | 10/2002 | Minagawa et al. | .......... 318/801 |
| 6,703,734 B2 | * | 3/2004 | Hakamata et al. | ............ 310/90 |

FOREIGN PATENT DOCUMENTS

| | | |
|---|---|---|
| JP | 62-173998 | 7/1987 |
| JP | 63-287350 | 11/1988 |
| JP | 06-024382 | 3/1994 |
| JP | 10-127007 | 5/1998 |
| JP | 10-191604 | 7/1998 |
| JP | 2001-124163 | 5/2001 |

* cited by examiner

*Primary Examiner*—Dang D Le
(74) *Attorney, Agent, or Firm*—Harness, Dickey & Pierce, P.L.C.

(57) ABSTRACT

A small, lightweight relative drive device is provided, which is capable of producing large torque. The relative drive device of a two-phase magnetic excitation type according to an aspect of the invention comprises first and second coil groups and a magnet group. The magnet group includes magnets disposed with alternating north and south poles facing the first and second coil groups. The first and second coil groups are disposed at positions that are out of phase with each other by an odd multiple of $\pi/2$ in electrical angles. The coils in the first and second coil groups have substantially no magnetic material cores, and the relative drive device has substantially no magnetic material yoke for forming a magnetic circuit.

15 Claims, 18 Drawing Sheets

RELATIVE ACCELERATION MODE $Fb \fallingdotseq K \times Fr + Fa$

RELATIVE DECELERATION MODE $Fb \fallingdotseq -K \times Fr + Fa$

AA cross section'

Fig.4A
FIRST ROTOR UNIT 10
Fig.4B
SECOND ROTOR UNIT 30
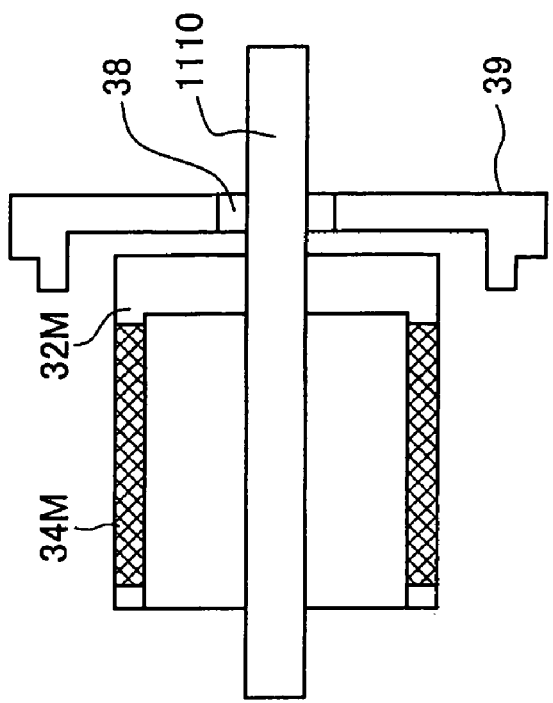
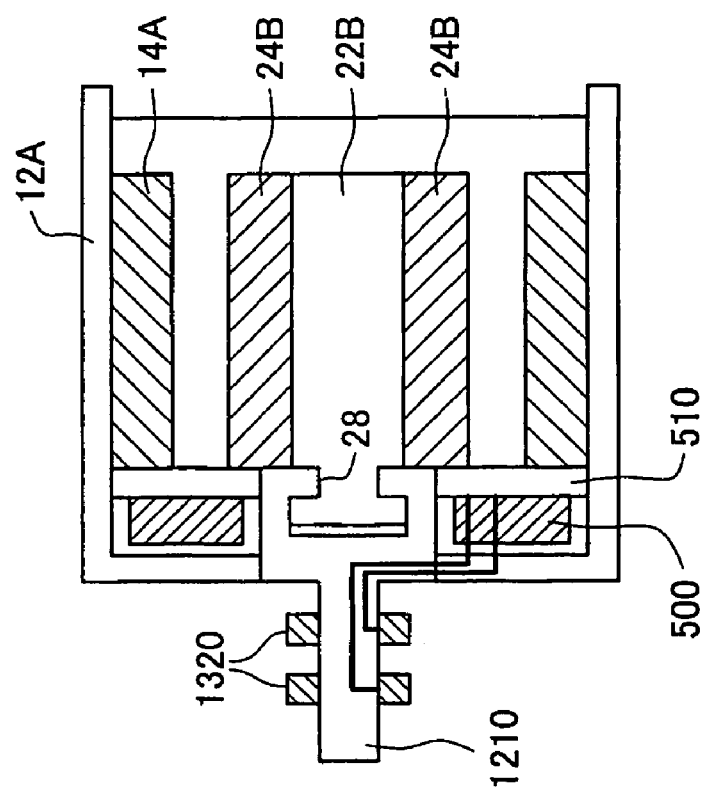

Phase = immediately before $2\pi$ (A-phase polarity is inverted at $2\pi$)

Phase = $\pi/4$

Phase = immediately before $\pi/2$ (B-phase polarity is inverted at $\pi/2$)

Phase = $3\pi/4$

Minimum torque generation

Low speed rotation

High speed rotation

<u>FIFTH EMBODIMENT</u>
Phase = immediately before $2\pi$ (A-phase polarity is inverted at $2\pi$)

Phase = $\pi/4$

Phase = immediately before $\pi/2$ (B-phase polarity is inverted at $\pi/2$)

Phase = $3\pi/4$

SIXTH EMBODIMENT
Phase = immediately before $2\pi$ (A-phase polarity is inverted at $2\pi$)

Phase = immediately before $\pi/3$ (C-phase polarity is inverted at $\pi/3$)

Phase = immediately before $2\pi/3$ (B-phase polarity is inverted at $2\pi/3$)

RELATIVE DRIVE DEVICE

CROSS REFERENCE TO RELATED APPLICATIONS

The present application claims the priority based on Japanese Patent Application No. 2004-147130 filed on May 18, 2004, the disclosure of which is hereby incorporated by reference in its entirety.

BACKGROUND OF THE INVENTION

1. Field of the Invention

The present invention relates to a device for driving two driving force transmission members relative to each other, using electrical energy.

2. Description of the Related Art

Various transmission systems are known as devices for driving two drive shafts relative to each other (for example, JP-2001-124163-A).

However, conventional transmission systems are able to transmit driving force in only one predetermined direction from one drive shaft to another drive shaft. Furthermore, in order to recover electrical power by so-called regeneration, it is necessary to provide a separate motor.

SUMMARY OF THE INVENTION

An object of the present invention is to provide a novel relative drive device employing a system that is different from the systems of conventional devices.

According to an aspect of the present invention, there is provided a relative drive device for driving a first driving force transmission member and a second driving force transmission member relative to each other. The relative drive device comprises: first and second coil groups connected to the first driving force transmission member; and a magnet group connected to the second driving force transmission member. The first and second coil groups each includes a plurality of electrically interconnected coils disposed along a predetermined direction at a predetermined pitch. The magnet group includes a plurality of magnets disposed with alternating north and south poles facing the first and second coil groups. The first and second coil groups are disposed at positions that are out of phase with each other by an odd multiple of $\pi/2$ in electrical angles. The coils in the first and second coil groups have substantially no magnetic material cores, and the relative drive device has substantially no magnetic material yoke for forming a magnetic circuit.

Since this relative drive device does not have a magnetic-material core, and therefore allows for smooth and stable relative driving, without producing cogging. Moreover, because the device has substantially no magnetic-material yoke, a highly efficient relative drive device can be realized, having almost no iron loss (eddy current loss).

According to another aspect of the present invention, the relative drive device comprises: first, second and third coil groups connected to the first driving force transmission member; and a magnet group connected to the second driving force transmission member. The first, second and third coil groups each includes a plurality of electrically interconnected coils disposed along a predetermined direction at a predetermined pitch. The magnet group includes a plurality of magnets disposed with alternating north and south poles facing the first, second and third coil groups. The first, second and third coil groups are disposed at positions that are successively out of phase with one another by $2\pi/3$ in electrical angles. The coils in the first, second and third coil groups have substantially no magnetic material cores, and the relative drive device has substantially no magnetic material yoke for forming a magnetic circuit.

This construction also allows for the realization of a highly efficient relative drive device having substantially no iron loss, and capable of smooth, stable operation, without generating cogging torque.

Note that the present invention can be realized in various different modes, such as a relative drive device, a device for controlling a relative drive device, or a method for driving such devices.

These and other objects, features, aspects, and advantages of the present invention will become more apparent from the following detailed description of the preferred embodiments with the accompanying drawings.

BRIEF DESCRIPTION OF THE DRAWINGS

FIGS. 4A and 4B are sectional views of the first rotor unit and the second rotor unit.

DESCRIPTION OF THE PREFERRED EMBODIMENT

Various embodiments of the present invention are described in the following order:
A. First Embodiment
B. Second Embodiment
C. Third Embodiment
D. Fourth Embodiment E. Fifth Embodiment
F. Sixth Embodiment
G. Variants

A. First Embodiment

Figure 1:
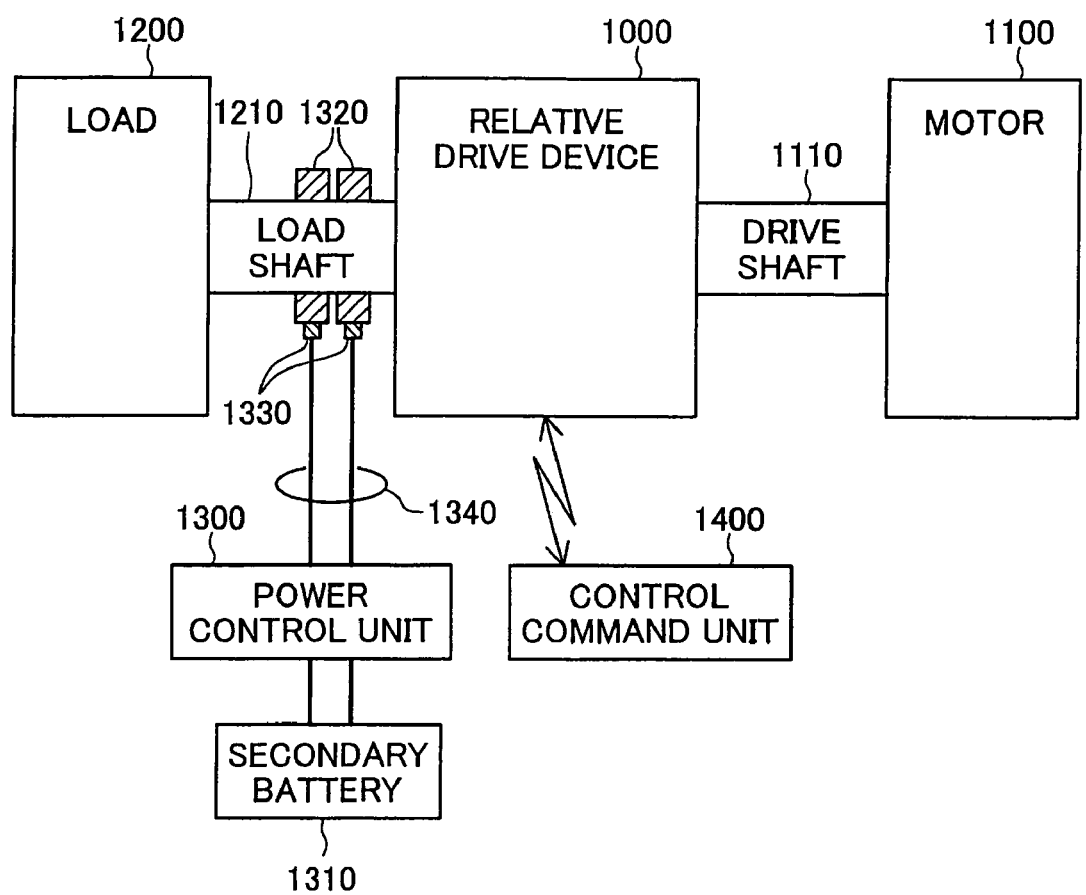
FIG. 1 is a block diagram illustrating a drive system according to the first embodiment of the present invention.

FIG. 1 is a block diagram illustrating a drive system according to a first embodiment of the present invention. This system comprises a relative drive device 1000, a motor 1100, a load 1200, a power control unit 1300 and a control command unit 1400. The power control unit 1300 is connected to a secondary battery 1310.

An internal combustion engine or an electric motor can be used as the motor 1100. The load 1200 may, for example, take the form of the wheels of an automobile. The motor 1100 and the relative drive device 1000 are interconnected by the drive shaft 1110. The relative drive device 1000 and the load 1200 are interconnected by a load shaft 1210. DC power contacts 1320 are provided on the load shaft 1210. The contacts 1320 are connected to a drive control circuit unit (described hereinbelow), which is internal to the relative drive device 1000. The contacts 1320 are also connected to the power control unit 1300 by way of brushes 1330 and power lines 1340. Note that the contacts 1320 do not function as commutators, but rather form unbroken and continuous contacts around the entire circumference of the shaft.

As described hereinbelow, the control command unit 1400 is a device for wireless transmission of control commands to the drive control circuit unit, which is internal to the relative drive device 1000. Note that the term "wireless" is used in the broadest sense, encompassing not only radio frequency communication but also optical and infrared communication. However, instead of transmitting the control commands wirelessly, the control command unit 1400 may also transmit control commands by way of the power lines (which is to say, by way of the brushes 1330 and the contacts 1320).

Figure 2A:
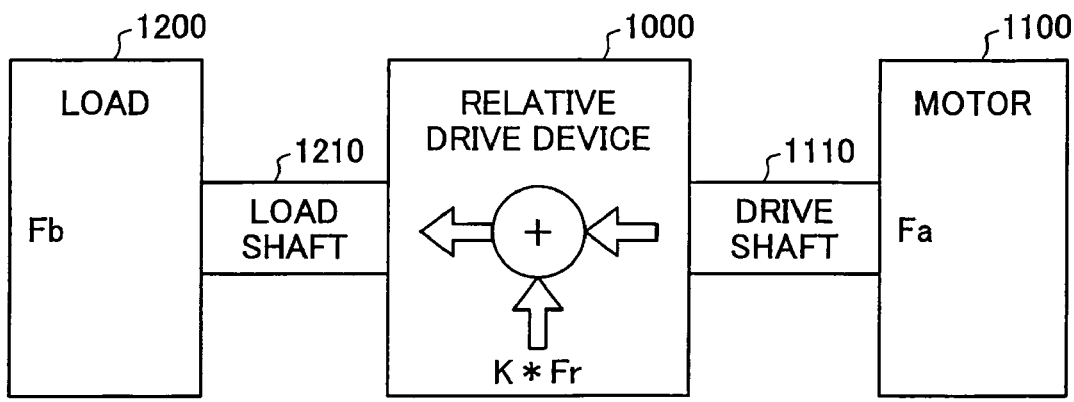
FIGS. 2A and 2B show two operating modes of the relative drive device.
Figure 2B:
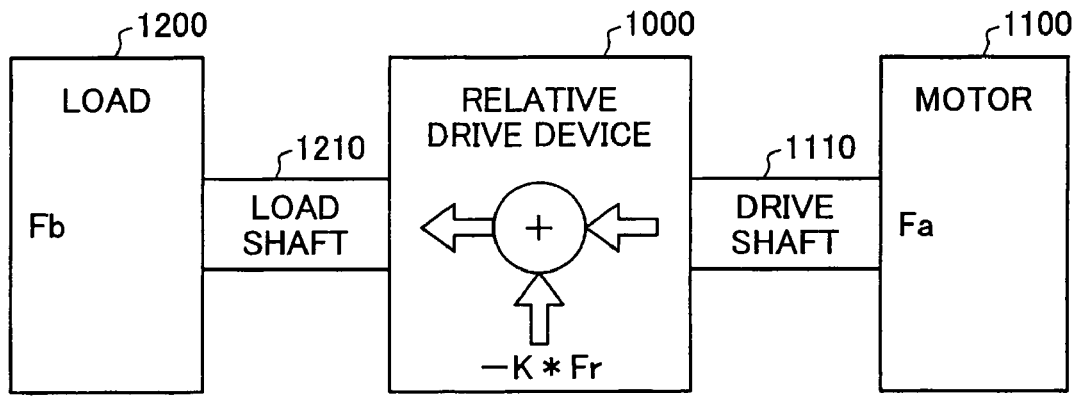

FIGS. 2A and 2B illustrate two operating modes (also referred to as "drive modes") of the relative drive device 1000. FIG. 2A illustrates a relative acceleration mode. In this mode, the energy of each of the parts is given by the following Formula (1).

$$Fb \approx K \times Fr + Fa \quad (1)$$

where Fa is the kinetic energy of the drive shaft 1110, Fb is the kinetic energy of the load shaft 1210, Fr is the electoral energy of the relative drive device 1000, and K is the conversion efficiency between the electrical energy and the kinetic energy.

In this relative acceleration mode, the relative drive device 1000 transmits a kinetic energy of K×Fr, which is added to the kinetic energy Fa of the drive shaft 1110, to the load shaft 1210.

FIG. 2B illustrates a relative deceleration mode. In this mode, the energy of each of the parts is given by the following Formula (2).

$$Fb \approx -K \times Fr + Fa \quad (2)$$

In this relative deceleration mode, the relative drive device 1000 transmits the kinetic energy Fa of the drive shaft 1110, from which K×Fr has been subtracted, to the load shaft 1210. The electrical energy Fr can be recovered as regenerative power.

Note that additional operating modes for the relative drive device 1000 include a holding mode wherein the drive shaft 1110 and the load shaft 1210 rotate in a fixed relationship, and an idling mode wherein the drive shaft 1110 and the load shaft 1210 are in free rotation with respect to each other. In the holding mode, the relative drive unit 1000 is capable of generating a sufficient holding force as a result of supplying electrical current to an internal coil (described hereinafter). Meanwhile, idling mode can be achieved by supplying no electrical current to the internal coil. As can be understood from this, the relative drive device 1000 can also function as a clutch.

Figure 3B:
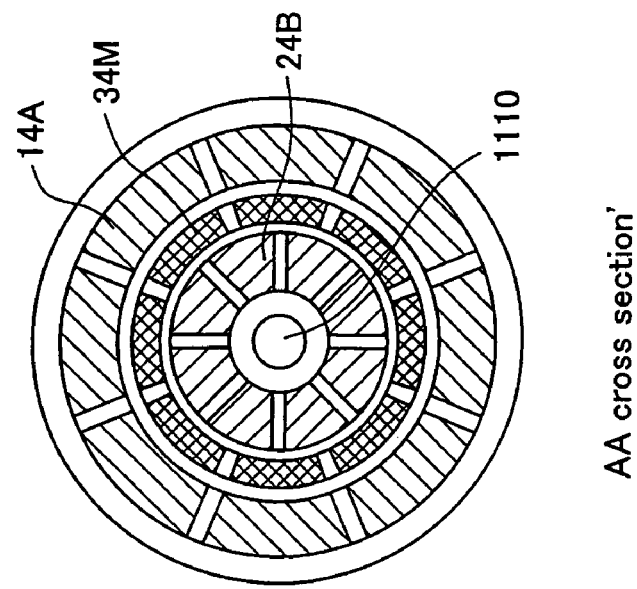
FIGS. 3A and 3B are sectional views illustrating the mechanical structure of the relative drive device according to the first embodiment.
Figure 3A:
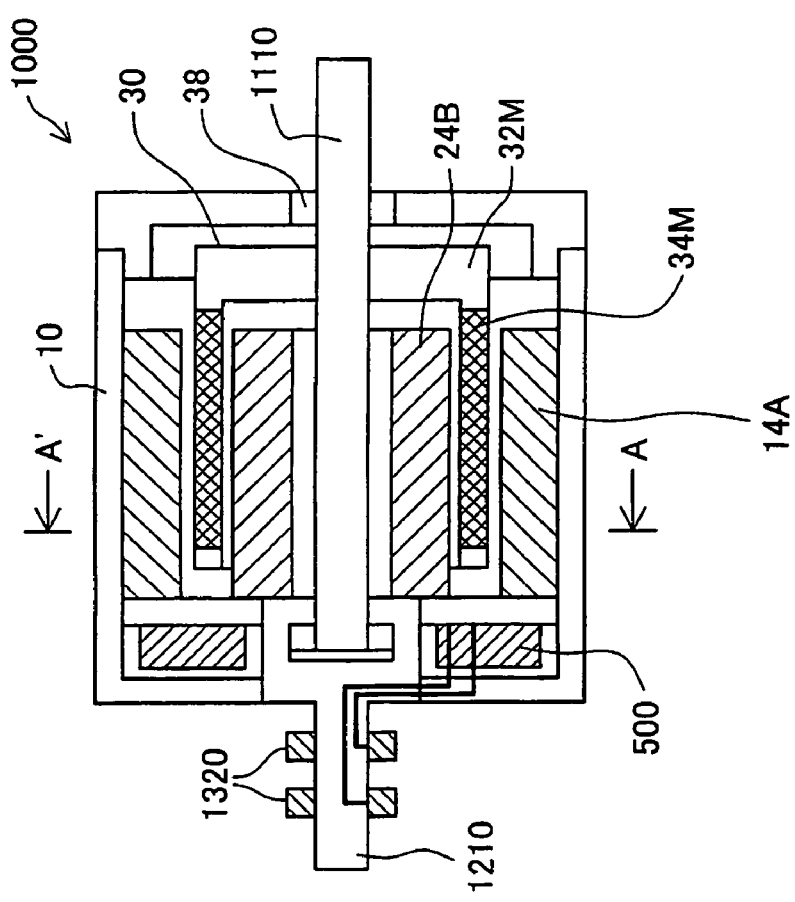

FIGS. 3A and 3B are sectional views illustrating the mechanical structure of the relative drive device 1000 according to the first embodiment. The relative drive device 1000 comprises a first rotor unit 10 and a second rotor unit 30. The first rotor unit 10 is fixed to the load shaft 1210. The second rotor unit 30 is fixed to the drive shaft 1110. If the first rotor unit 10 is thought of as a stator and the second rotor unit 30 is thought of as a rotor, it can be understood that the relative drive device 1000 has motor structure of the inserted rotor type, wherein a substantially cylindrical rotor is inserted into a substantially cylindrical double stator.

FIGS. 4A and 4B show the first rotor unit 10 and the second rotor unit 30, when separated. The first rotor unit 10, shown in FIG. 4A, comprises an A-phase coil group 14A, disposed on an interior face of a hollow cylindrical case 12A, and a B-phase coil group 24B, disposed on a substantially cylindrical support member 22B at the interior thereof. The A-phase coil group 14A is disposed at the exterior of the second rotor unit 30, and the B-phase coil group 24B is disposed at the interior of the second rotor unit 30. A bearing 28 for the drive shaft 1110, a base 510 and a drive circuit unit 500 are further provided at the interior of the first rotor unit 10. The drive circuit unit 500 is provided with electrical power by way of the contacts 1320, which are fixed on the load shaft 1210.

As shown in FIG. 4B, the second rotor unit 30 comprises a magnet group 34M, which is fixed on a substantially cylindrical support member 32M. The second rotor unit 30 further comprises a cover 39 for closing the case 12A of the first rotor unit 10, and a bearing 36 is provided in this cover 39.

Note that, in the example shown in FIG. 3B, the A-phase coil group 14A and the B-phase coil group 24B each have eight coils. The magnet group 34M likewise have eight magnets. However, any number of coils and any number of magnets can be used.

The structure shown in FIGS. 3A and 3B is such that the two coil groups 14A and 24B are disposed on two cylindrical members forming a hollow double-cylinder structure, and the magnet group 34M is disposed on another cylindrical member, which is inserted between the coil groups 14A and 24B. This structure, wherein three hollow cylindrical members are concentrically overlaid, is hereinafter referred to as a "hollow multi-cylinder structure." Adopting this hollow multi-cylinder structure is advantageous in that it makes it possible to limit the vibration of the rotor units 10 and 30. The reason for this is that the forces capable of generating vibration in the rotor units (imbalances in the attractive force and the repellant force between the coil groups 14A, 24B and the magnet group 34M) cancel each other out across the rotational axis.

Figure 5A:
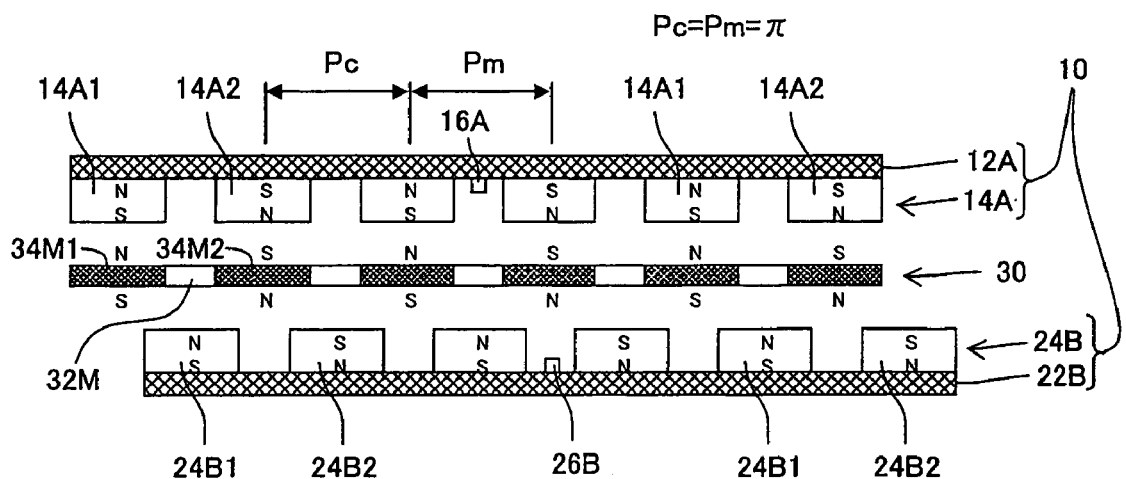
FIG. 5A schematically illustrates the relative positions of the coil groups on the first rotor unit and the magnet group on the second rotor unit.

FIG. 5A shows the relative positions of the coil group on the first rotor unit 10 and the magnet group on the second rotor unit 30. As described above, the first rotor unit 10 comprises the A-phase coil group 14A, which is fixed on the case 12A (hereinafter also referred to as a "support member") and the B-phase coil group 24B, which is disposed on the support member 22B. The A-phase coil group 14A comprises two types of coils 14A1 and 14A2, which are excited in opposite directions, and are alternately disposed at a fixed pitch Pc. In the state shown in FIG. 5A, the coils are excited so that the direction of magnetization (direction oriented from the north pole to the south pole) of the three coils 14A1 is downward, while the direction of magnetization of the other three coils 14A2 is upward. Likewise, the B-phase coil group 24B also comprises two types of coils 24B1 and 24B2, which are excited in the opposite directions, and are alternately disposed at the fixed pitch Pc. In the present specification the term "coil pitch Pc" is defined as the pitch between coils in the A-phase coil group or the pitch between coils in the B-phase coil group.

The second rotor unit 30 comprises the magnet group 34M, which is fixed on the support member 32M. The permanent magnets in this magnet group 34M are disposed so that the direction of magnetization thereof is perpendicular to the direction in which the magnets in the magnet group 34M are aligned, which is the horizontal direction in FIG. 5A. The magnets in the magnet group 34M are disposed at a fixed magnetic pole pitch Pm. In this example, the magnetic pole pitch Pm is equal to the coil pitch Pc which, given as an electrical angle, corresponds to $\pi$. Note that an electrical angle of $2\pi$ can be considered to correspond to the mechanical angle, or distance, traveled when the phase of the drive signal supplied to the coil group has changed by $2\pi$. In the first embodiment, if the phases of the drive signals for the A-phase coil group 14A and the B-phase coil group 24B change by $2\pi$, the magnet group 34M is displaced by twice the coil pitch Pc.

Note that the A-phase coil group 14A and the B-phase coil group 24B are disposed at positions such that the electrical angles thereof differ from each other by $\pi/2$. The A-phase coil group 14A and the B-phase coil group 24B differ only in terms of positioning, the constructions thereof being otherwise substantially identical. Accordingly, in describing the coil group hereinbelow, unless specifically necessary, only the A-phase coil group is described.

Figure 5B:
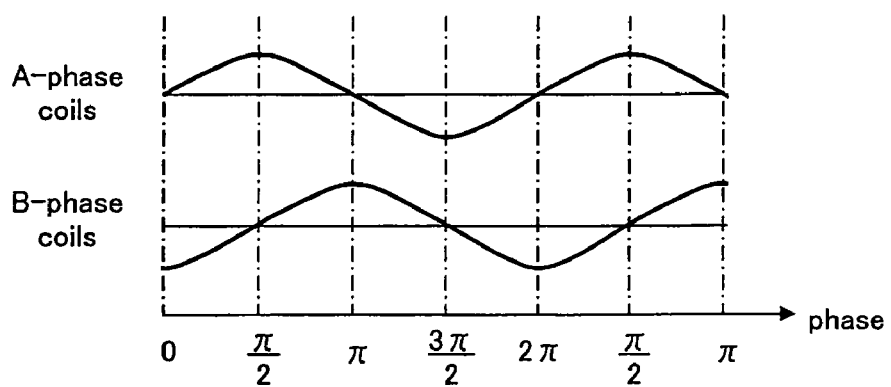
FIG. 5B shows AC drive signals.

FIG. 5B shows one example of the waveforms of the AC drive signals supplied to the A-phase coil group 14A and the B-phase coil group 24B in the relative acceleration mode (FIG. 2A). The A-phase coil group 14A and the B-phase coil group 24B are supplied with a two-phase AC signal. The drive signals for the A-phase group 14A and the B-phase group 24B are out of phase with each other by $\pi/2$. The state shown in FIG. 5A corresponds to phase zero or $2\pi$.

As shown in FIG. 5A, this relative drive device 1000 further comprises a position sensor 16A for the A-phase coil group 14A and another position sensor 26B for the B-phase coil group 24B. Hereinafter, these are referred to as the "A-phase sensor" and the "B-phase sensor." The A-phase sensor 16A is disposed at a position centered between two coils in the A-phase coil group 14A, and the B-phase sensor 26B is disposed at a position centered between two coils in the B-phase coil group 24B. It is preferable that these sensors 16A and 26B be sensors that deliver an analog output with a waveform similar to the AC drive signal shown in FIG. 5B, such as Hall ICs that make use of the Hall effect. However, sensors having a digital output with a rectilinear waveform can also be used. Furthermore, it is also possible to omit these sensors and carry out drive operations without sensors.

Note that the support members 12A, 22B and 32M are each made of nonmagnetic material. Furthermore, it is preferable that all parts of the relative drive device in the present embodiment be formed from nonmagnetic and non-electroconductive material, with the exception of the electrical wiring including the coils and the sensors, the magnets, the shafts and the bearings therefor.

Figure 6A:
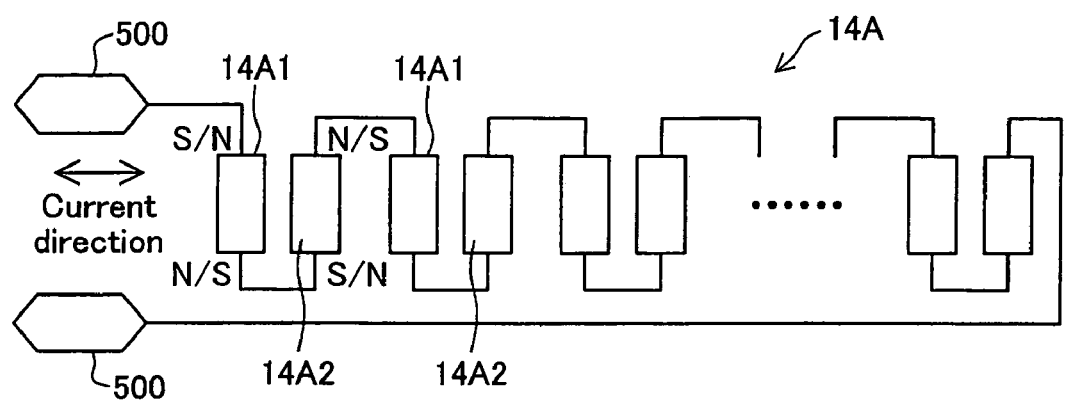
FIGS. 6A and 6B show methods for connecting the coils.
Figure 6B:
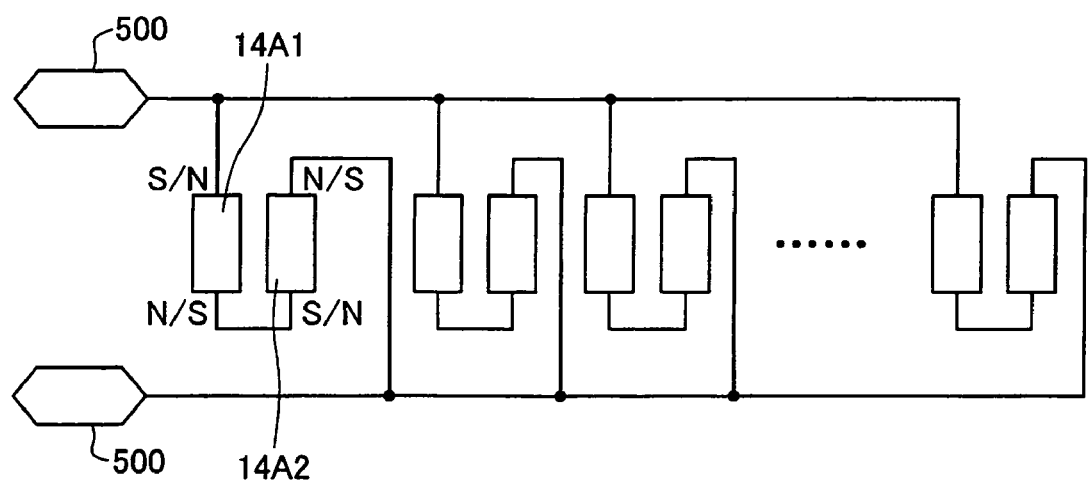

FIGS. 6A and 6B illustrate methods for connecting the two types of coils 14A1 and 14A2, in the A-phase coil group 14A. According to the connection method shown in FIG. 6A, all of the coils in the A-phase coil group 14A are connected in series to the drive circuit unit 500. Meanwhile, according to the connection method shown in FIG. 6B, a plurality of groups of series connections, each comprising one pair of coils 14A1 and 14A2, are connected in parallel. With either connection method, the two types of coils 14A1 and 14A2 are magnetized with opposite polarities at all times.

FIGS. 7A to 7D illustrate the operation of a relative drive device according to the first embodiment. Note that, in this example, the magnet group 34M is depicted as traveling to the right over time with respect to the coil groups 14A and 24B.

Figure 7A:
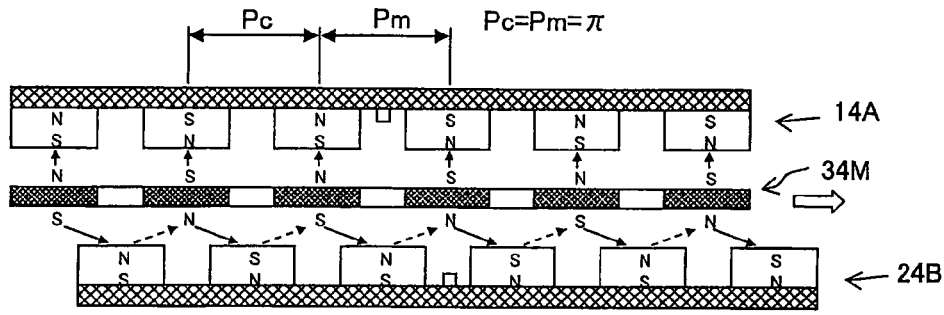
FIGS. 7A through 7D show the operations of the relative drive device according to the first embodiment.

FIG. 7A shows the situation immediately before the phase is $2\pi$. Note that the solid arrows depicted between the coils and the magnets indicate the direction of attractive force, and the dashed arrows indicate the direction of repulsive force. In this state, the A-phase coil group 14A does not exert driving force on the magnet group 34M in the operating direction (to the right in the drawing), but magnetic force is exerted in the direction of attraction of the magnet group 34M to the A-phase coil group 14A. Accordingly, it is preferable that zero voltage be applied to the A-phase coil group 14A when the phase is $2\pi$. Meanwhile, the B-phase coil group 24B exerts driving force on the magnetic group 34M in the operating direction. Furthermore, the B-phase coil group 24B does not only exert an attractive force on the magnet group 34M, but also a repulsive force, so that the net force applied to the magnet group 34M by the B-phase coil group 24B in the vertical direction (the direction perpendicular to the operating direction of the magnet group 34M) is zero. Accordingly, it is preferable that the voltage applied to the B-phase coil group 24B be at the peak value when the phase is $2\pi$.

Figure 7B:
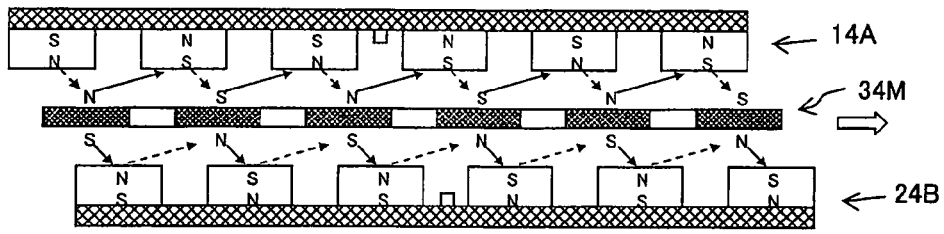
Figure 7C:
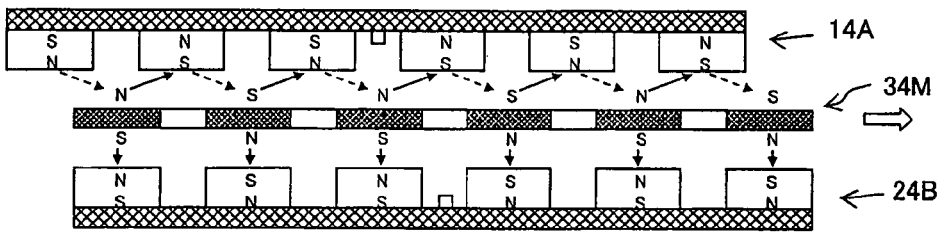
Figure 7D:
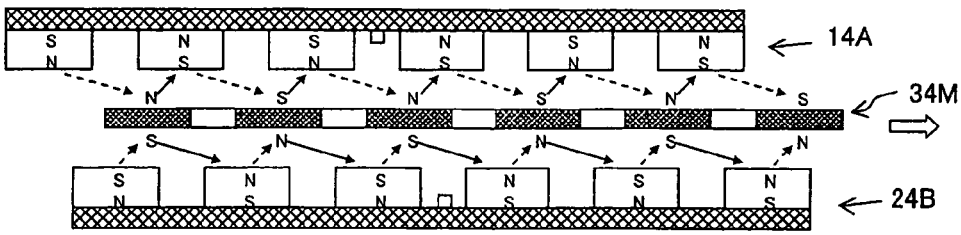

As shown in FIG. 5B, the polarity of the A-phase coil group 14A is inverted when the phase is at $2\pi$. In FIG. 7B, with the phase at $\pi/4$, the polarity of the A-phase coil group 14A is inverted with respect to that in FIG. 7A. In this state, the A-phase coil group 14A and the B-phase coil group 24B exert the same driving force on the magnet group 34M in the operating direction. FIG. 7C shows the situation when the phase is immediately before $\pi/2$. In this state, in a manner opposite to the situation in FIG. 7A, only the A-phase coil group 14A exerts a driving force on the magnet group 34M in the operating direction. When the phase is at $\pi/2$, the polarity of the B-phase coil group 24B is inverted to produce the polarity shown in FIG. 7D. FIG. 7D shows the situation where the phase is at $3\pi/4$. In this state, the A-phase coil group 14A and the B-phase coil group 24B exert the same driving force on the magnet group 34M in the operating direction.

As can be understood from FIG. 7A to FIG. 7D, the polarity of the A-phase coil group 14A is switched at a timing when the coils in the A-phase coil group 14A are opposite the magnets in the magnet group 34M. The same is true for the B-phase coil group. Consequently, it is possible to generate driving force from all of the coils at substantially all times, allowing for generation of a large amount of torque.

Note that the period of time when the phase is $\pi$ to $2\pi$ is substantially the same as in FIG. 7A to FIG. 7D, and therefore detailed description thereof is omitted. However, the polarity of the A-phase coil group 14A is once again inverted at a timing when the phase is $\pi$, and the polarity of B-phase coil group 24B is once again inverted at a timing when the phase is $3\pi/2$.

As will be understood from the foregoing description, the relative drive device of the present embodiment allows driving force in the operating direction to be produced with respect to the magnet group 34M, by using the attractive force and repulsive force between the coil groups 14A, 24B and the magnet group 34M. In particular, in the present embodiment, as the coil groups 14A, 24B are disposed on the opposite sides of the magnet group 34M, it is possible to exploit the magnetic flux on both sides of the magnet group 34M to generate driving force. Accordingly, it is possible to realize a more efficient relative drive device, having higher magnetic flux usage efficiency and greater torque, as compared to conventional electric motors wherein driving force is generated only on one side of the magnets.

Furthermore, the relative drive device of the present embodiment is capable of realizing smooth and stable operations without so-called cogging, because no magnetic material core is used. Furthermore, as a yoke is not used to create a magnetic circuit, the so-called iron loss (eddy current loss) is extremely small, thus allowing for the realization of an efficient relative drive device.

It is of note that, in an ordinary motor, the flux usage efficiency is thought to decrease if a core and a yoke are not used. Meanwhile, with the relative drive device of the present embodiment, as the coil groups 14A, 24B are disposed on the opposite sides of the magnetic group 34M, there is no need to provide a core or a yoke, since the flux usage efficiency is sufficiently high. The core and the yoke result in cogging and increased weight, and therefore it is actually preferable that no a core or yoke be used. Furthermore, the lack of a yoke means that there is no iron loss, which is advantageous in that it allows higher efficiency.

Thus, it is preferable that, in the relative drive device of the present invention, various types of nonmagnetic and non-electroconductive materials be used for the rotor materials (particularly the support member 32M of the second rotor unit 30), the bobbin material (core material) and the case material (support member 12A of the first rotor unit 10). However, it is possible to use metallic materials such as aluminum or its alloys for the rotor material (magnetic group support member 32M) due to considerations of strength. In this case also, it is preferable that the bobbin material and the case material be formed from substantially nonmagnetic and non-electroconductive materials. Here, the term "substantially nonmagnetic and non-electroconductive material" means that small portions of magnetic materials or conductive materials can be permitted. For example, whether or not the bobbin material is formed from a substantially nonmagnetic and non-electroconductive material can be determined according to whether or not the relative drive device exhibits cogging torque. Furthermore, whether or not the case material is formed from a substantially non-electroconductive material can be determined according to whether or not the iron loss (eddy current loss) resulting from the case material is below a predetermined value (for example 1% of the input).

Note that among the structural materials comprised by the relative drive device, some elements are preferably made from metallic materials, such as the shafts and bearings. Herein, the term "structural materials" means materials used to support the form of the relative drive device. That is to say, the term "structural materials" refers to major materials and does not encompass small parts and fittings. Structural materials include the rotor materials (support member 32M of the second rotor unit 30) and the case materials. In the relative drive device of the present invention, it is preferable that the major structural materials other than the shafts and the bearings be formed from nonmagnetic and non-electroconductive materials.

Figure 8:
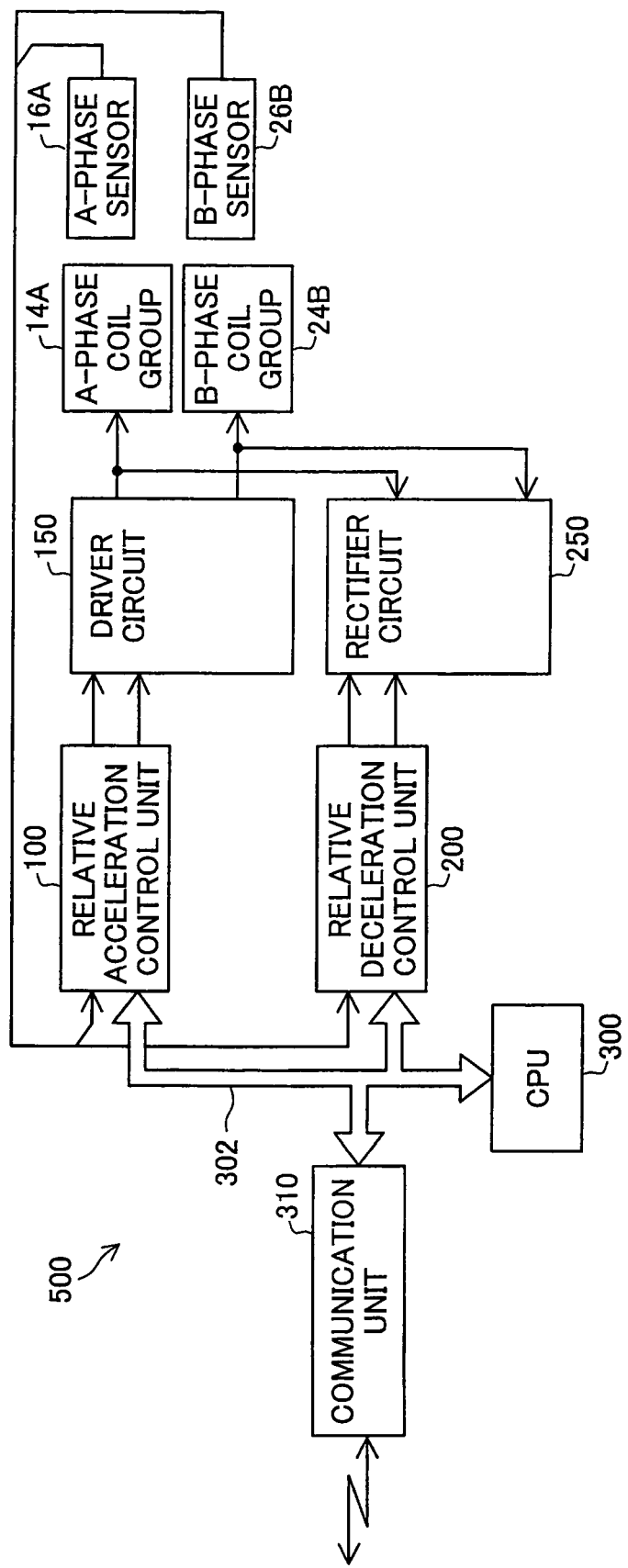
FIG. 8 is a block diagram illustrating the internal structure of a drive circuit unit.

FIG. 8 is a block diagram illustrating the internal structure of the drive circuit unit 500. The drive circuit unit 500 comprises a CPU 300, a communications unit 310, a relative acceleration control unit 100, a relative deceleration control unit 200, a driver circuit 150, and a rectifier circuit 250. The communication unit 310 and the two control units 100 and 200 are connected to the CPU 300 by a bus 302. The relative acceleration control unit 100 and the driver circuit 150 are circuits for controlling the operation of the relative drive device 1000 in the relative acceleration mode described in FIG. 2A. The relative deceleration control unit 200 and the rectifier circuit 250 are circuits for controlling the operation of the relative drive device 1000 in the relative deceleration mode described in FIG. 2B. The communication unit 310 has a function that allows signals to be wirelessly sent to, and received from, the control command unit 1400 (FIG. 1). However, it is also possible that the communication unit 310 has only a signal reception function.

Figure 9:
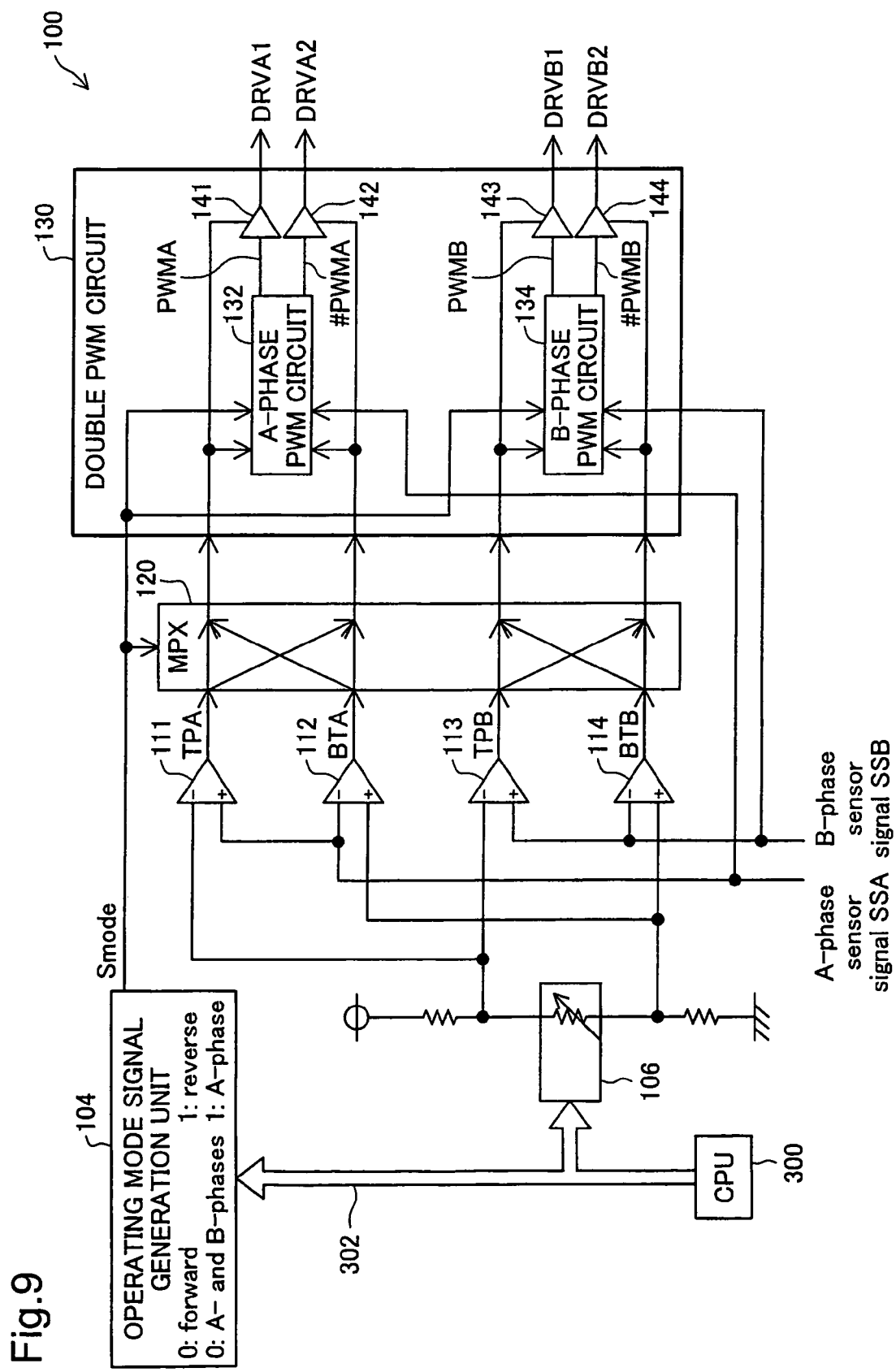
FIG. 9 is a view illustrating the internal structure of a relative acceleration control unit.

FIG. 9 illustrates the internal structure of the relative acceleration control unit 100. The relative acceleration control unit 100 comprises an operating mode signal generation unit 104 connected to the bus 302, and an electronic variable resistor 106. The operating mode signal generation unit 104 generates an operating mode signal $S_{mode}$. The operating mode signal $S_{mode}$ comprises a first bit for indicating either forward rotation or reverse rotation, and a second bit for indicating an operating mode wherein both the A-phase and the B-phase are used, or an operating mode wherein only the A-phase is used. Note that, when the first rotor unit 10 and the second rotor unit 30 move from the holding mode to the relative acceleration mode, it is preferable that both the A-phase and the B-phase coil groups be used, so as to reliably establish a desired operating direction. However, after current begins to flow, under operating conditions requiring minimal torque, it is possible to continue operations in a sufficient manner using only one of the A-phase coil group or the B-phase coil group. The second bit of the operating mode signal $S_{mode}$ is a flag serving to indicate an operation with only the A-phase coils in such cases.

The voltage at the two ends of the electronic variable resistor 106 is applied to one of the input terminals of four voltage comparators 111 to 114. An A-phase sensor signal SSA and a B-phase sensor signal SSB are supplied to the other input terminals of the voltage comparators 111 to 114. The output signals from the four voltage comparators 111 to 114, TPA, BTA, TPB and BTB are referred to as "mask signals" or "enable signals." The meanings of these names are explained hereinafter.

The mask signals TPA, BTA, TPB and BTB are input to a multiplexer 120. The multiplexer 120 switches the output terminals for the mask signals TPA and BTA for the A-phase coils, and switches the output terminals for the mask signals TPB and BTB for the B-phase coils, according to the operating mode signal $S_{mode}$, whereby the relative operating directions of the first rotor unit 10 and the second rotor unit 30 can be reversed. The mask signals TPA, BTA, TPB and BTB output from the multiplexer 120 are supplied to a double PWM circuit 130.

The double PWM circuit 130 comprises an A-phase PWM circuit 132, a B-phase PWM circuit 134 and four 3-state buffer circuits 141 to 144. The output signal SSA from the A-phase sensor 16A (FIG. 8) (hereinafter referred to as the "A-phase sensor signal") and the operating mode signal $S_{mode}$ are supplied to the A-phase PWM circuit 132. The output signal SSB from the B-phase sensor 26B and the operating mode signal $S_{mode}$ are supplied to the B-phase PWM circuit 134. These two PWM circuits 132 and 134 generate PWM signals PWMA, #PWMA, PWMB and #PWMB, in response to the sensor signals SSA and SSB. Note that the signals #PWMA and #PWMB are the inverted forms of the signals PWMA, PWMB. As described above, both of the sensor signals SSA and SSB are sine-wave signals, and the PMW circuits 132 and 134 perform well-known PMW operations in response to these sine-wave signals.

The signals PWMA and #PWMA, which are generated by the A-phase PWM circuit 132, are respectively supplied to the input terminals of the two 3-state buffer circuits 141 and 142. The A-phase mask signals TPA and BTA from the multiplexer 120 are supplied to the control terminals of these 3-state buffer circuits 141 and 142. The output signals DRVA1 and DRVA2 of the 3-state buffer circuits 141 and 142 are drive signals for the A-phase coils (hereinafter referred to as "A1 drive signal" and "A2 drive signal"). Likewise for the B-phase, drive signals DRVB1 and DRVB2, for the B-phase coil group, are generated by a PWM circuit 134 and 3-state buffer circuits 143 and 144.

Figure 10:
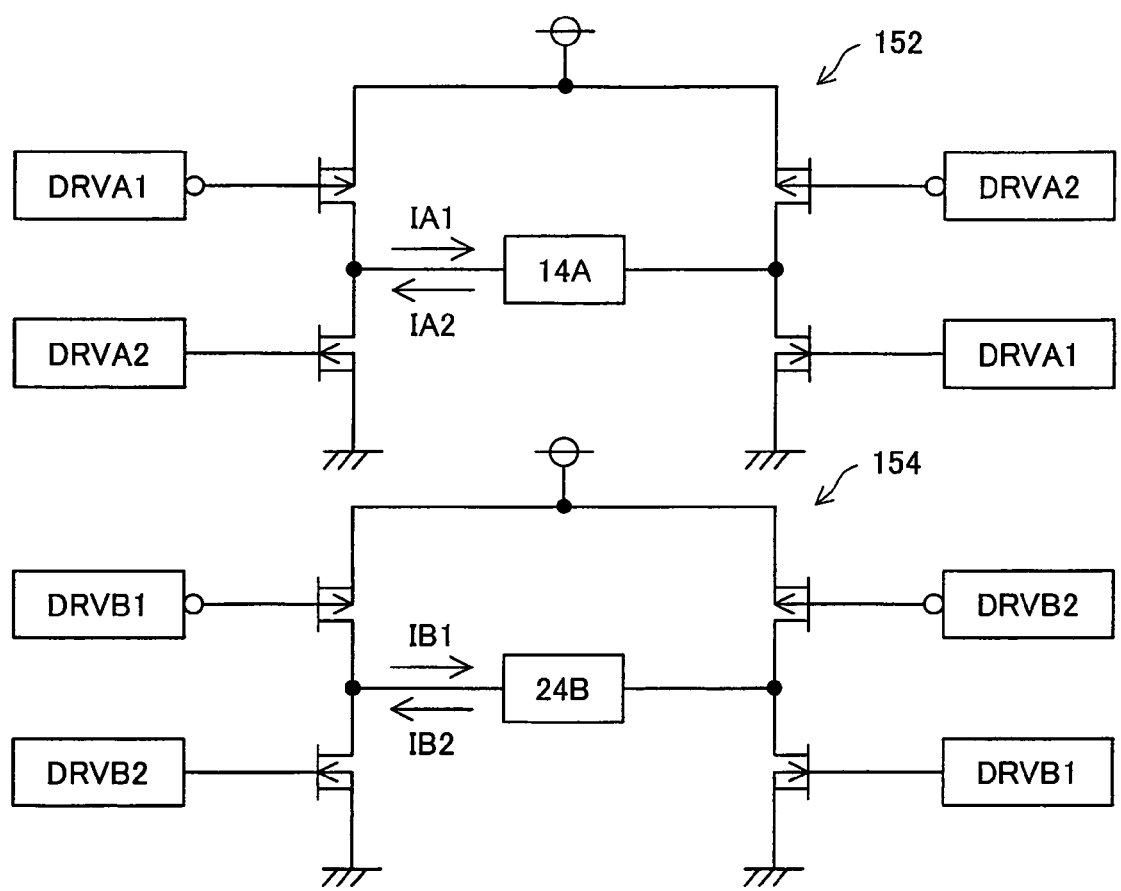
FIG. 10 is a view illustrating the internal structure of a driver circuit for relative acceleration.

FIG. 10 illustrates the internal structure of the driver circuit 150 (FIG. 8) for the relative acceleration mode. The A-phase driver circuit 152 is an H-bridge circuit for supplying AC drive signals DRVA1 and DRVA2 to the A-phase coil group 14A. Note that the hollow circles appended to the ends of the blocks indicating the drive signals indicate that the signal is inverted with negative logic. Furthermore, the arrows labeled with the reference numerals IA1 and IA2 indicate the current direction according to the A1 drive signal DRVA1 and the A2 drive signal DRVA2, respectively. The construction of the B-phase drive circuit 154 is the same as the construction of the A-phase drive circuit 152.

Figure 11:
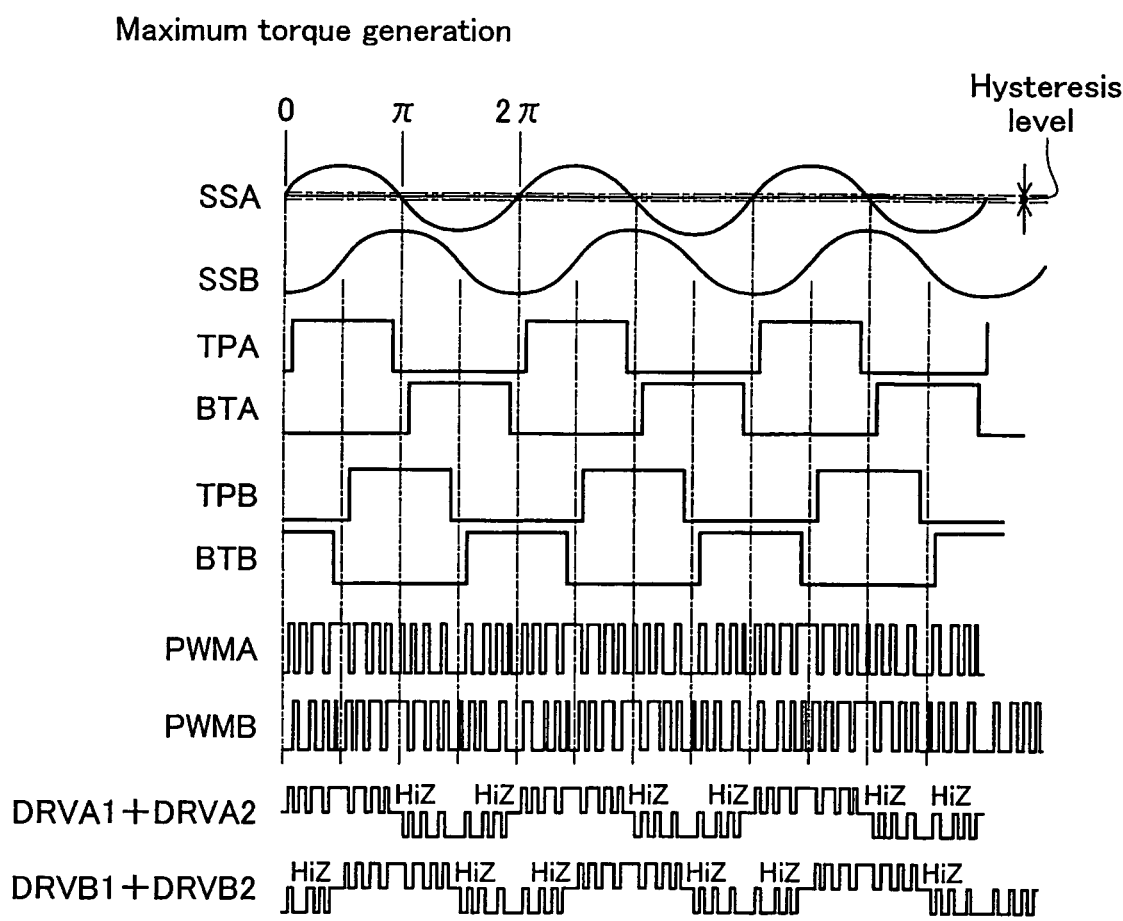
FIG. 11 is a timing chart showing the various signal waveforms in the relative acceleration mode.

FIG. 11 is a timing chart showing the various signal waveforms in the relative acceleration mode. The A-phase sensor signal SSA and the B-phase sensor signal SSB are sine waves, which are out of phase with each other by $\pi/2$. The A-phase PWM circuit 132 generates a signal PWMA (seventh signal from the top in FIG. 11) having an average voltage proportional to the level of the A-phase sensor signal SSA. The first A-phase mask signal TPA allows the signal PWMA to be applied to the A-phase coil group 14A when this signal TPA is high-level, and prohibits it when the signal is low-level. Similarly, the second A-phase mask signal BTA also allows the signal PWMA to be applied to the A-phase coil group 14A when this signal BTA is high-level, and prohibits it when the signal is low-level. However, the first A-phase mask signal TPA is high-level when the PWM signal PWMA is on the plus side, and the second A-phase mask signal BTA is high-level when the PWM signal PWMA is on the minus side. As a result, the drive signal DRVA1+DRVA2 shown second from the bottom in FIG. 11 is applied to the A-phase coil group 14A. As can be understood from this description, the A-phase mask signals TPA and BTA can be considered as signals for allowing the PWM signal PWMA to be applied to the A-phase coil group 14A, and can also be considered as signals that mask the PWM signal PWMA so that it is not applied to the A-phase coil group 14A. The same is true for the B-phase.

Note that FIG. 11 illustrates the operating state when a large torque is generated between the first rotor unit 10 and the second rotor unit 30. In this case, the periods during which both of the mask signals TPA and BTA are low-level are short; accordingly, voltage is applied to the A-phase coil group 14A almost all of the time. Note that the hysteresis level is indicated at the right-hand end of the waveform of the A-phase sensor signal SSA. Herein, the term "hysteresis level" means the ineffective (which is to say not usable) signal level range in the vicinity of the zero level of the sine-wave signal. It will be understood that, when a large torque is generated, the hysteresis level is extremely small. Note that the hysteresis level can be changed by varying the duty of the mask signals TPA, BTA, TPB and BTB by varying the resistance of the electronic variable resistor 106.

Figure 12:
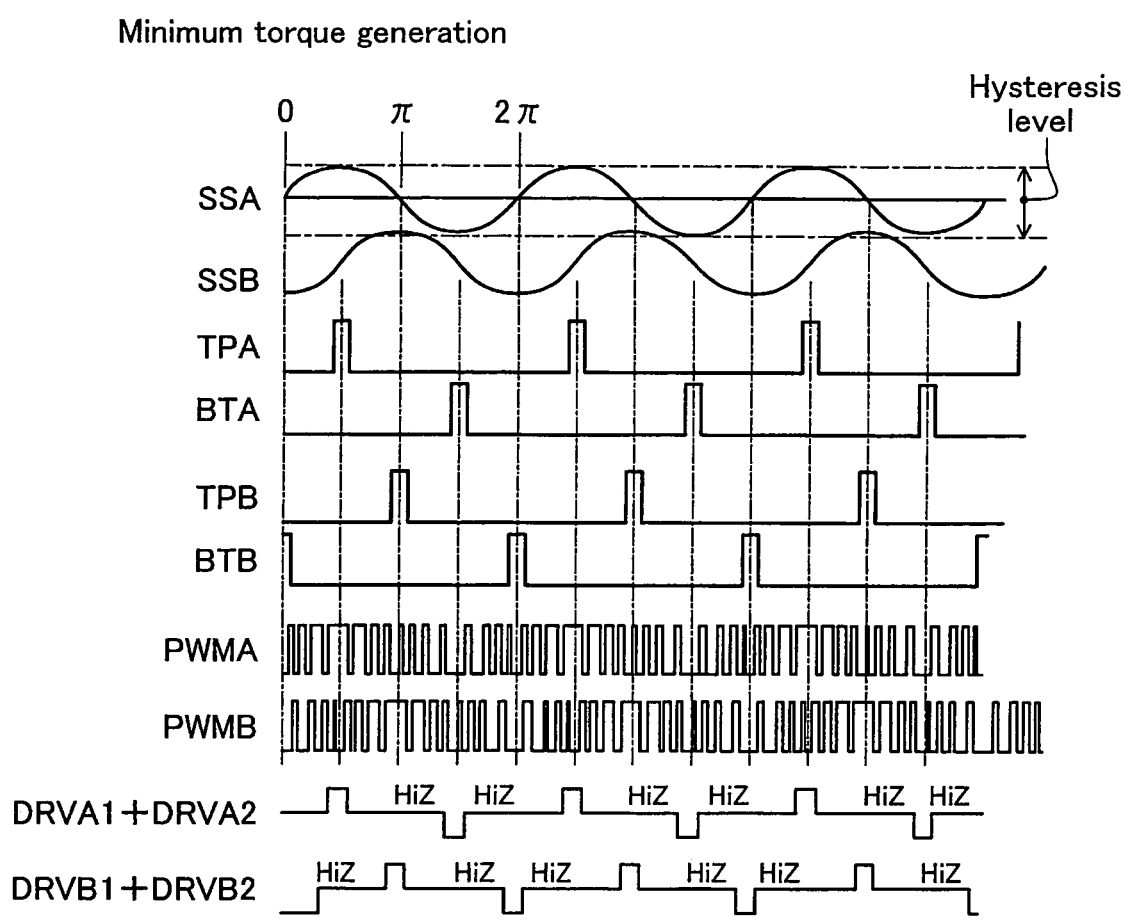
FIG. 12 is a timing chart showing the various signal waveforms in the relative acceleration mode.

FIG. 12 illustrates the operating conditions when a small amount of torque is generated. Note that a small amount of torque means high rpm. At this time, the duty cycles of the mask signals TPA, BTA, TPB and BTB are set to shorter duty cycles than in FIG. 11; in accordance with which, the number of pulses of the drive signals for the coils (DRVA1+DRVA2) and (DRVB1+DRVB2) is also reduced. Furthermore, the hysteresis level is also increased.

As can be understood by comparing FIG. 11 and FIG. 12, the period during which the first A-phase mask signal TPA is high-level is symmetrically centered around the timing at which the A-phase sensor signal SSA reaches the maximum value (the point in time at which the phase is at $\pi/2$). Likewise, the period during which the second A-phase mask signal BTA is high-level is symmetrically centered around the timing at which the A-phase sensor signal SSA reaches the minimum value (the point in time at which the phase is at $3\pi/2$). Thus, the periods during which these mask signals TPA and BTA are high-level are symmetrically centered around the timing at which the A-phase sensor signal SSA reaches peak values. In other words, the PWM signal PWMA masking period can also be understood as being set so that the signal PWMA is masked over a range of time centered around the timing ($\pi$ or $2\pi$) at which the polarity of the AC drive signal (the waveform shown in FIG. 5B), which is simulated according to the signal PWMA, is inverted.

It is of note that, as described by FIG. 7A, the A-phase coil group 14A does not generate the driving force very efficiently when the phase is in the vicinity of $2\pi$. The same is true when the phase is in the vicinity of $\pi$. Furthermore, the A-phase coil group 14A generates effective driving force with the most efficiency when the phase is in the vicinity of $\pi/2$ and $3\pi/2$. When the required output from the relative drive device 1000 is small, as shown in FIG. 12 mentioned above, the double PWM circuit 130 of this embodiment does not apply voltage to the A-phase coil group 14A when the phase is in the vicinity of $\pi$ and $2\pi$; and as shown in FIG. 11 and FIG. 12, voltage is applied to the A-phase coil group 14A centered around the phase in the vicinity of $\pi/2$ and $3\pi/2$. Thus, the A-phase mask signals TPA and BTA mask the PWM signal PWMA so as to preferentially use the period in which the A-phase coil group 14A produces the most efficient driving force, which allows for increased motor efficiency. Note that, if voltage is applied to the A-phase coil group 14A when the phase is near $\pi$ and $2\pi$, as described by FIG. 7A, there is a strong attractive force between the A-phase coil group 14A and the magnet group 34M, which results in vibration of the second rotor unit 30. For this reason as well, it is preferable that voltage be not applied to the A-phase coil group 14A when the phase is in the vicinity of $\pi$ and $2\pi$. These facts are equally true as applies to the B-phase coil group 24B. However, because the polarity of the B-phase coil group 24B is inverted when the phase is at $\pi/2$ and $3\pi/2$, as shown in FIG. 5B, it is preferable that voltage not be applied to the B-phase coil group 24B when the phase is in the vicinity of $\pi/2$ and $3\pi/2$.

Figure 13:
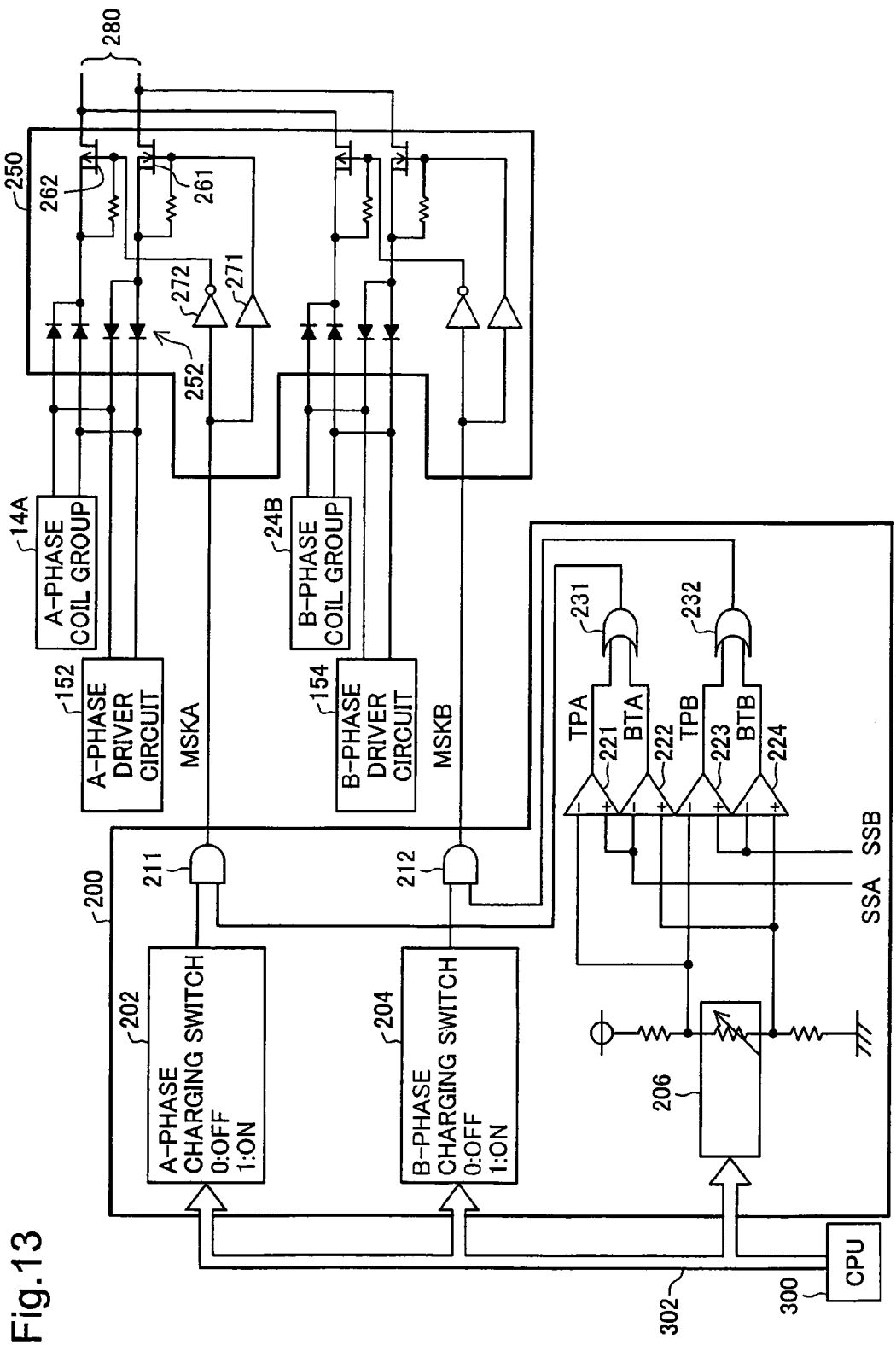
FIG. 13 is a view illustrating the internal structure of a relative deceleration control unit and a rectifier circuit.

FIG. 13 illustrates the internal structure of the relative deceleration control unit 200 (FIG. 8) and the rectifier circuit 250. The relative deceleration control unit 200 comprises an A-phase charging switch 202, a B-phase charging switch 204 and an electronic variable resistor 206, which are connected to the bus 302. The output signals from the two charging switches 202 and 204 are applied to the input terminals of two AND circuits 211 and 212.

The A-phase charging switch 202 outputs a "1" level signal when regenerative power is recovered from the A-phase coil group 14A, and outputs a "0" level signal when this is not recovered. The B-phase charging switch 204 is the same. Note that these signal levels are switched by the CPU 300.

Furthermore, whether or not regeneration is performed from the A-phase coil group 14A and whether or not regeneration is performed from the B-phase coil group 24B can be established separately. Accordingly, it is, for example, possible to generate driving force using the A-phase coil group 14A, while regenerating power from the B-phase coil group 24B.

The relative acceleration control unit 100 may also have a construction whereby, whether or not driving force is generated using the A-phase coil group 14A and whether or not driving force is generated using the B-phase coil group 24B can be determined independently. This construction may, for example, be such that the drive mode signal generation unit 104 outputs a signal indicating whether or not drive is produced by the A-phase coil group 14A, and a signal indicating whether or not drive is produced by the B-phase coil group 24B. In this manner, it is possible to operate the relative drive device in an operating mode wherein driving force is generated by either one of the two coil groups 14A and 24B, while power is regenerated by the other coil group.

The voltage at both ends of the electronic variable resistor 206 is applied to one of the two input terminals of the four voltage comparators 221 to 224. The A-phase sensor signal SSA and the B-phase sensor signal SSB are supplied to the other input terminals of the voltage comparators 221 to 224. The output signals TPA, BTA, TPB and BTB from the four voltage comparators 221 to 224 can be referred to as "mask signals" or "enable signals."

The mask signals TPA and BTA for the A-phase coils are input to an OR circuit 231, and the mask signals TPB and BTB for the B-phase are input to another OR circuit 232. The output from these OR circuits 231 and 232 are applied to the input terminals of the aforementioned two AND circuits 211 and 212. The output signals MSKA and MSKB from these AND circuits 211 and 212 are also referred to as "mask signals" or "enable signals."

Note that the construction of the electronic variable resistor 206 and the four voltage comparators 221 to 224 is the same as the construction of the electronic variable resistor 106 and the four voltage comparators 111 to 114 in the relative acceleration control unit 100 shown in FIG. 9. Accordingly, the A-phase coil output signals from the OR circuit 231 correspond to the logical sum of the mask signals TPA and BTA shown in FIG. 11. Furthermore, when the output signal of the A-phase charging switch 202 is at level "1," the mask signal MSKA output by the A-phase coil AND circuit 211 is the same as the output signal from the OR circuit 231. These operations are the same for the B-phase.

The rectifier circuit 250 comprises, as circuits for the A-phase coils, a full wave rectifier circuit 252 including a plurality of diodes, two gate transistors 261 and 262, a buffer circuit 271 and an inverter circuit 272 (NOT circuit). Note that the same circuits are also provided for the B-phase. The gate transistors 261 and 262 are connected to the power lines 280. These power lines 280 are connected to the contacts 1320, which are provided on the load shaft 1210 (FIG. 1).

During relative deceleration, the AC power generated by the A-phase coil group 14A is rectified by the full wave rectifier circuit 252. The mask signal MSKA for the A-phase coils and the inverted signal therefor are provided to the gates of the gate transistors 261 and 262 so that the gate transistors 261 and 262 are turned on/off in accordance therewith. Accordingly, while at least one of the mask signals TPA and BTA, which are output from the voltage comparators 221 and 222, is high-level, regenerated power is output to the power lines 280, but when both of the mask signals TPA and BTA are low-level, power regeneration is disabled.

As can be understood from the description given above, the relative deceleration control unit 200 and the rectifier circuit 250 recovers regenerated power in the relative deceleration mode. This regenerated power can be used for charging the secondary battery 1310 or as a power source for driving another electrical motor. Furthermore, the relative deceleration control unit 200 and the rectifier circuit 250 control the periods in which regenerated power is recovered from the A-phase coil group 14A and the B-phase coil group 24B in accordance with the mask signal MSKA for the A-phase coils and the mask signal MSKB for the B-phase coils, allowing for adjustment of the amount of relative deceleration (amount of energy Fr in FIG. 2B).

As described above, the relative drive device 1000 of the present embodiment is not provided with a magnetic material core so that so-called cogging is not produced during relative deceleration, whereby operations can be performed smoothly and stably. Furthermore, as the yoke is not used in order to create a magnetic circuit, the so-called iron loss (eddy current loss) is extremely small, allowing regenerated power to be efficiently recovered.

B. Second Embodiment

Figure 14A:
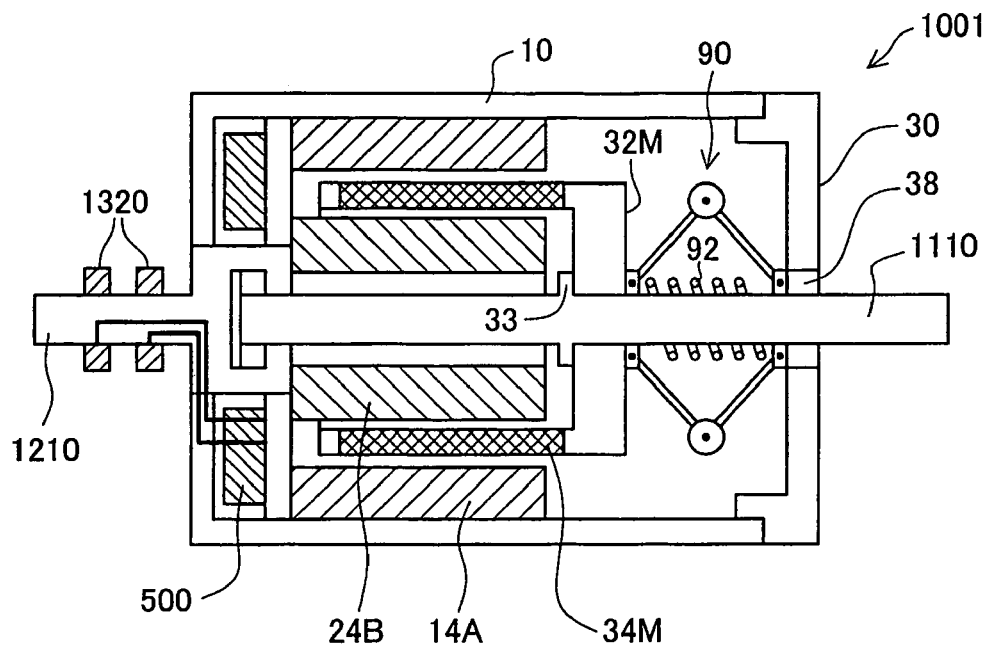
FIGS. 14A and 14B are sectional views of the relative drive device according to the second embodiment.
Figure 14B:
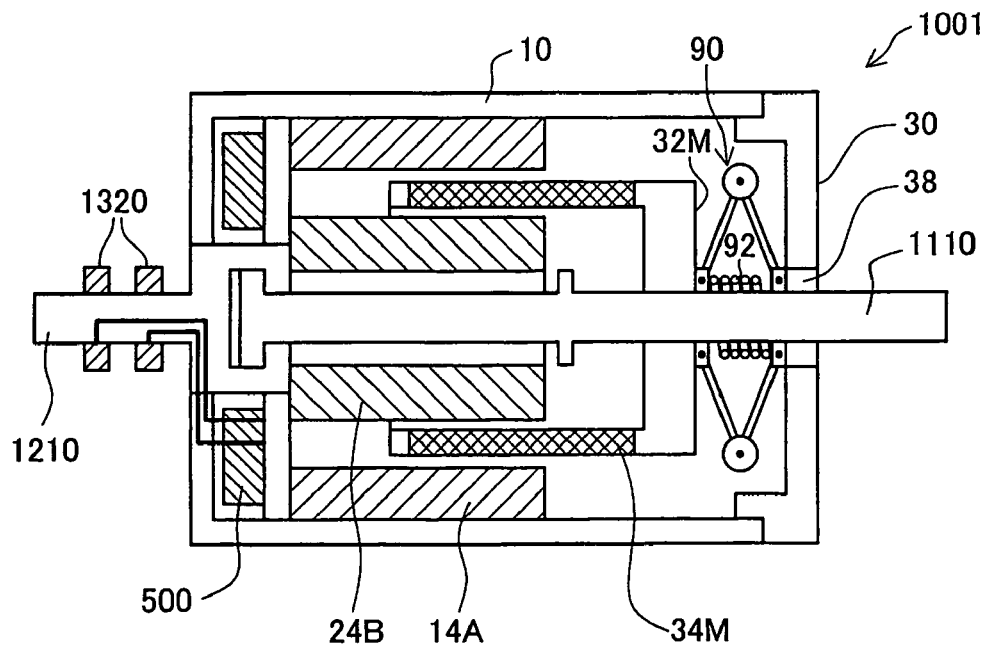

FIGS. 14A and 14B are cross-sectional views illustrating a second embodiment of the relative drive device 1001. This relative drive device 1001 is such that, in the device of the first embodiment shown in FIG. 3, a governor mechanism 90 is provided between the support member 32M for the magnet group 34M and the bearing 38, the rest of the structure being the same as in the first embodiment. The governor mechanism 90 comprises a spring 92 for urging the support member 32M for the magnet group 34M to the left in the drawing.

As shown in FIG. 14A, during low-speed rotation, the support member 32M for the magnet group 34M is maintained in a position pressed against a stopper 33 by the spring 92 of the governor mechanism 90. This state is substantially identical to the state shown in FIG. 3A. However, during high-speed rotation, as shown in FIG. 14B, the centrifugal force of the governor mechanism 90 compresses the spring 92 so that the support member 32M for the magnet group 34M moves to the right in the drawing. In this state, the overlap between the coil groups 14A, 24B and the magnet group 34M is reduced so that the magnetic coupling therebetween is weakened. It is of note that it is generally known that the rotational speed of a motor is inversely proportional to the counter electromotive coefficient Ke. If the magnetic coupling between the coils and the magnets in the motor is weakened, the counter electromotive force coefficient Ke is also lowered. In the state shown in FIG. 14B, the counter electromotive force coefficient Ke is lower than that in the state shown in FIG. 14A, and therefore greater rotational speed is possible. Consequently, the relative drive device 1001 of the second embodiment is characterized by a higher maximum relative rotational speed when no load is present (no-load rotational speed) than the relative drive device 1000 of the first embodiment.

Note that, in place of the governor mechanism 90, the magnet group 34M may be moved using another actuator such as an electrical motor. That is to say, it is preferable that an adjustment mechanism be provided whereby the magnetic coupling of the coil groups 14A and 24B and the magnet group 34M decreases with increases in the relative RPM of the two rotor units 10 and 30 (which is to say the relative operating speed).

C. Third Embodiment

Figure 15:
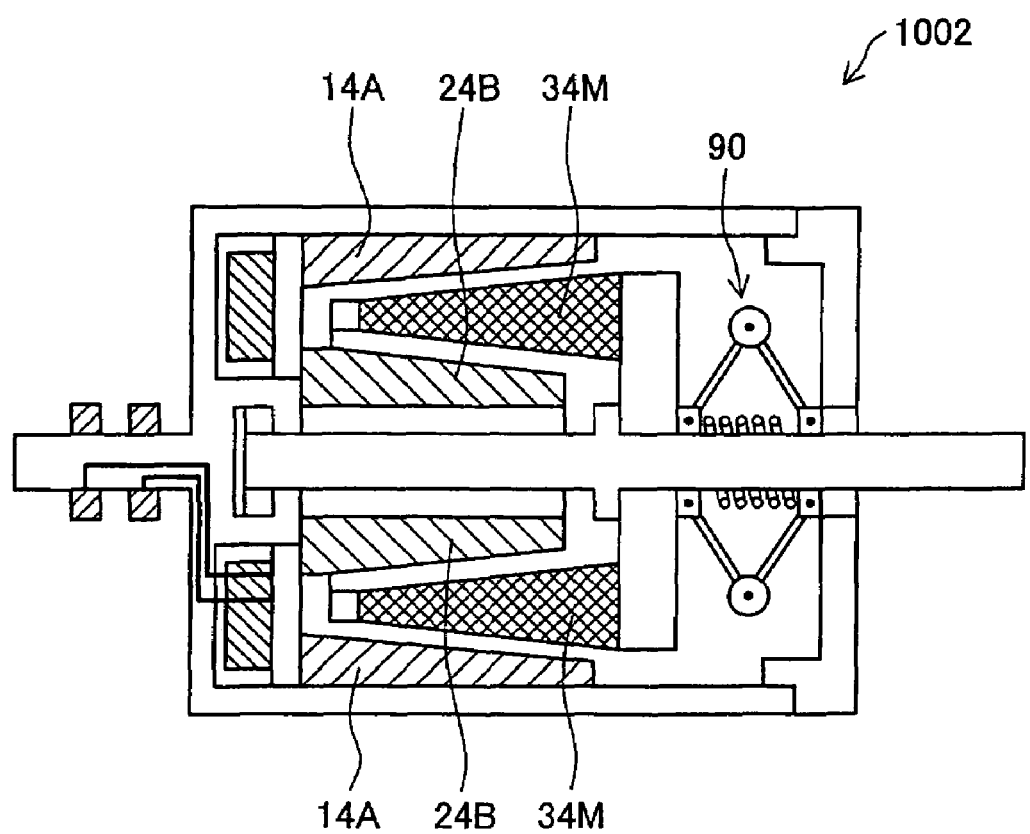
FIG. 15 is a sectional view of the relative drive device according to the third embodiment.

FIG. 15 is a sectional view illustrating a relative drive device 1002 according to a third embodiment. This relative drive device 1002 is such that, starting from the device according to the second embodiment shown in FIGS. 14A and 14B, the positioning of the coil groups 14A and 24B is changed so that the facing inner circumferential faces of the coil groups 14A and 24B are both tapered, and the sections of the magnets in the magnet group 34M are also tapered in a corresponding manner.

This relative drive device 1002 also comprises a governor mechanism 90 for changing the magnetic coupling between the coil groups 14A and 24B and the magnet group 34M. Accordingly, when the speed of revolution increases, the magnet group 34M moves to the right in the drawing so as to weaken the magnetic coupling between the coil groups 14A and 24B and the magnet group 34M. In particular, in the third embodiment, if the magnet group 34M moves to the right in response to increases in RPM, the gap between the coil groups 14A and 24B and the magnet group 34M (which is to say the separation therebetween) increases, so that the magnetic coupling therebetween is further weekend as compared with the second embodiment. Accordingly, a feature of this third embodiment is that it is possible to achieve higher relative rotational speeds.

D. Fourth Embodiment

Figure 16B:
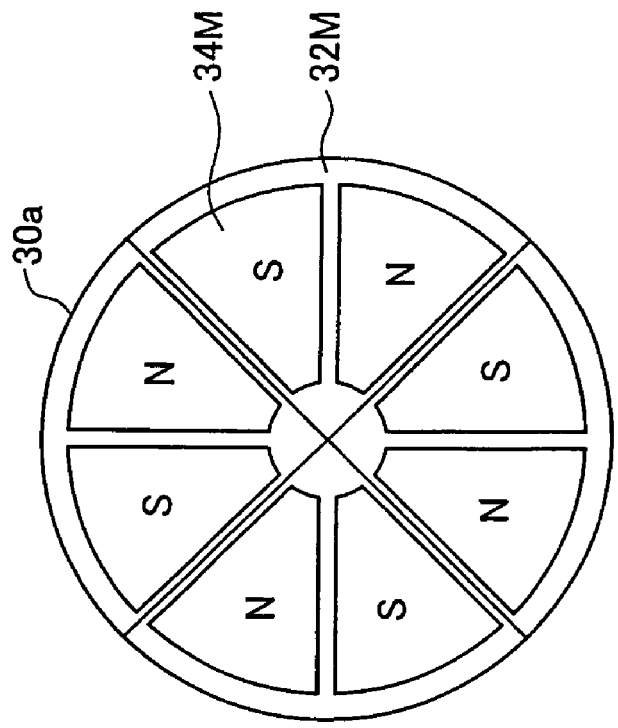
FIGS. 16A and 16B are sectional views of the relative drive device according to the fourth embodiment.
Figure 16A:
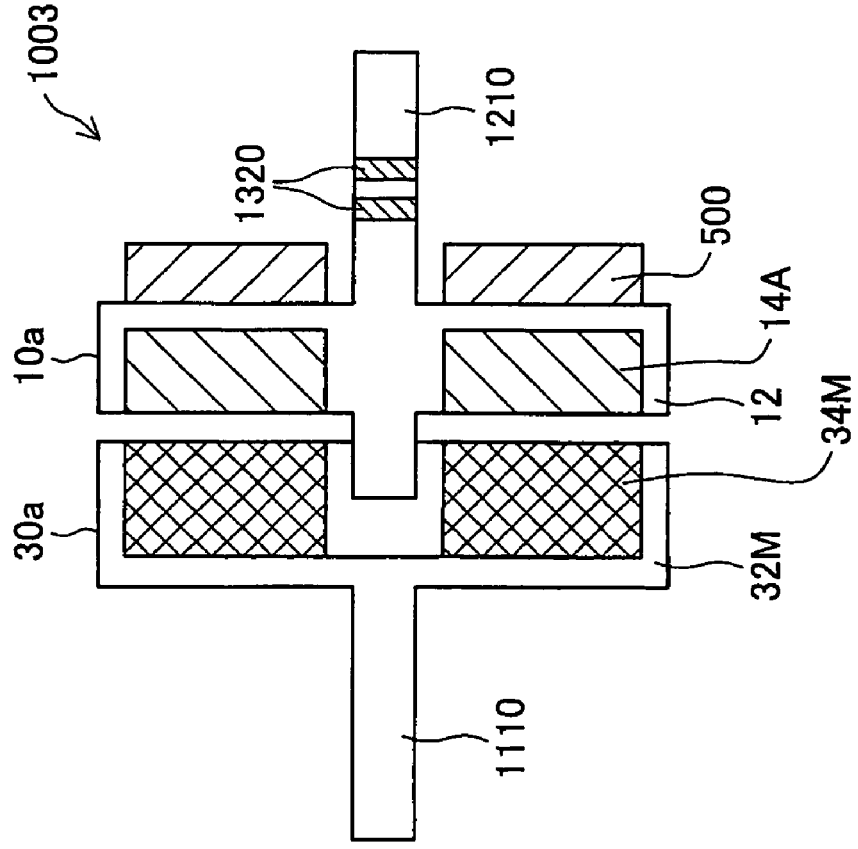
Figure 17A:
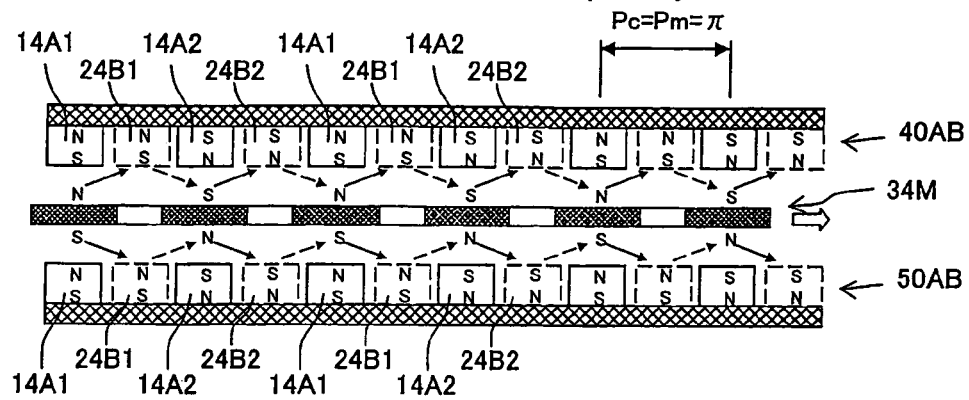
FIGS. 17A through 17D show the operations of the relative drive device according to the fifth embodiment.
Figure 17B:
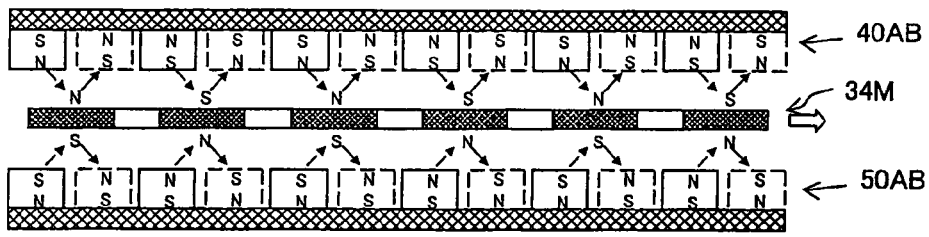
Figure 17C:
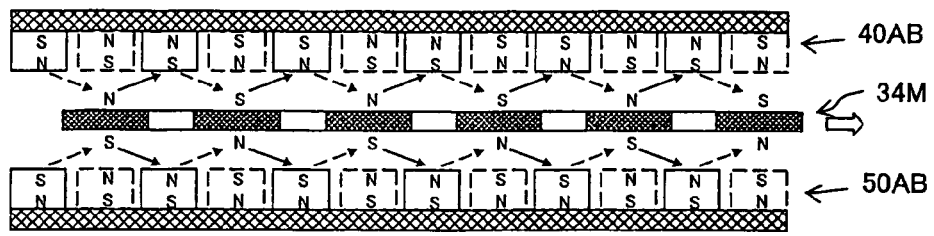
Figure 17D:
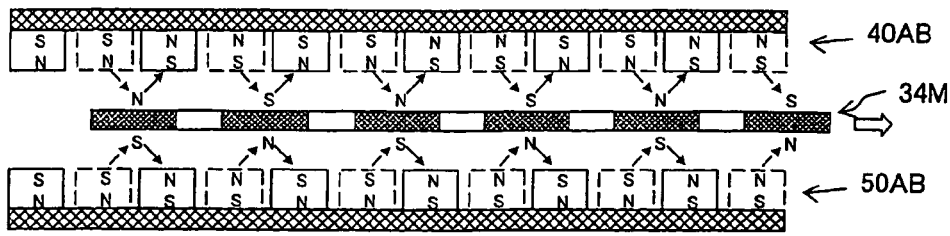

FIG. 16A and FIG. 16B are sectional views illustrating the mechanical structure of a relative drive device 1003 according to a fourth embodiment. A second rotor unit 30b of this relative drive device 1003 is such that, as shown in FIG. 16B, eight magnets in the magnet group 34M are aligned in the circumferential direction on a substantially discoid support member 32M. Likewise a first rotor unit 10a is such that eight coils in the coil group 14A are disposed on a substantially discoid support member 12. Different numbers of magnets and coils can also be used.

Note that, in this embodiment, no B-phase coil group 24B is provided. However, it is possible to provide a B-phase coil group 24B as a part of the first rotor unit 10a, on the side opposite to the A-phase coil group 14A (the left-hand side in FIG. 16A) so that the magnet group 34M lies therebetween.

With this relative drive device 1003 of the fourth embodiment as well, in the same manner as with the devices of the first embodiment to the third embodiment, it is possible to efficiently adjust the relative rotation between the drive shaft 1110 and the load shaft 1210.

E. Fifth Embodiment

FIGS. 17A to 17D illustrate the operation of a relative drive device according to a fifth embodiment; they correspond to FIGS. 7A to 7D in the first embodiment. Note that, for the mechanical structure, the structures of any of the first to fourth embodiments described above can be adopted.

The relative drive device according to this fifth embodiment comprises an upper coil group 40AB and a lower coil group 50AB on the opposite sides of the magnet group 34M. The upper coil group 40AB corresponds to bringing together, on the top side, both the A-phase coil group 14A and the B-phase coil group 24B of the first embodiment shown in FIG. 5A and FIGS. 7A-7D. In other words, the upper coil group 40AB includes both the two types of coils 14A1 and 14A2, included in the A-phase coil group 14A, and the two types of coils 24B1 and 24B2, included in the B-phase coil group 24B, which are disposed in a predetermined order. The lower coil group 50AB corresponds to bringing together, on the bottom side, the A-phase coil group 14A and the B-phase coil group 24B of the first embodiment. Note that, in FIG. 17A to 17D, for convenience of illustration, the coils in the A-phase coil group are depicted with solid lines while the coils in the B-phase coil group are depicted with dashed lines. The relative drive device according to the fifth embodiment has twice the number of coils as the device according to the first embodiment. Note that the coil pitch Pc is defined as the pitch between coils in the A-phase coil group, or the pitch between coils in the B-phase coil group, and therefore the coil pitch Pc in the fifth embodiment is the same as that in the first embodiment.

With this relative drive device according to the fifth embodiment also, as with the device according to the first embodiment, it is possible to efficiently adjust the relative rotation between the drive shaft and the load shaft.

Note that, because the upper coil group 40AB and the lower coil group 50AB in the fifth embodiment comprise A-phase coils and B-phase coils, it is possible to omit either one of the upper coil group 40AB or the lower coil group 50AB. However, from the point of view of efficient exploitation of the magnetic flux of the magnets, it is preferable that both the upper coil group 40AB and the lower coil group 50AB be provided.

F. Sixth Embodiment

Figure 18A:
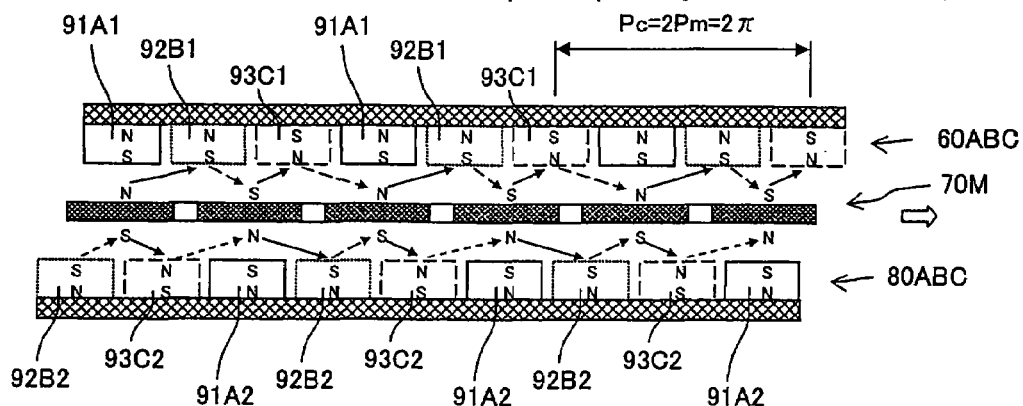
FIGS. 18A through 18C show the operations of the relative drive device according to the sixth embodiment.
Figure 18B:
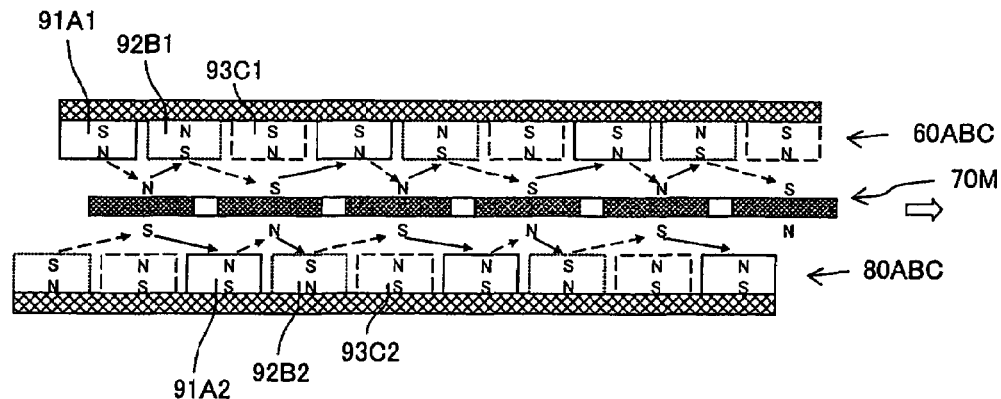
Figure 18C:
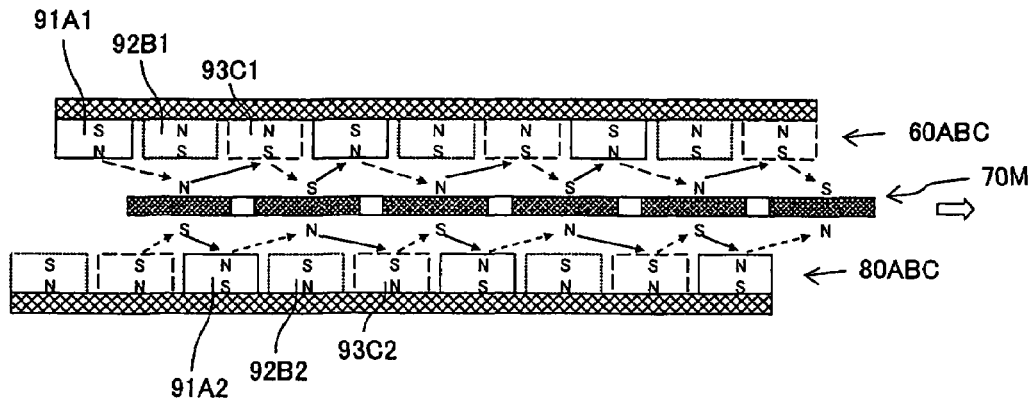

FIGS. 18A to 18C illustrate the alignment of the coil groups and the magnet group in a relative drive device according to a sixth embodiment. The structures of any of the first to fourth embodiments described above can be adopted for the mechanical structure thereof.

The relative drive device of the sixth embodiment functions as a three-phase motor having three coil groups for the A-phase, the B-phase and the C-phase. The magnet group 70M has the same construction as the magnet group 34M of the first embodiment shown in FIG. 5A. On both sides of the magnet group 70M are provided an upper coil group 60ABC and a lower coil group 80ABC. The upper coil group 60ABC includes A-phase coil group coils 91A1, B-phase coil group coils 92B1 and C-phase coil group coils 93C1, which are disposed in a predetermined order. Note that, in FIGS. 18A to 18C, for convenience of illustration, the coils in the A-phase coil group are depicted in solid lines, the coils in the B-phase coil group are depicted with dotted lines, and the coils in the C-phase coil group are depicted with dashed lines. The lower coil group 80ABC likewise includes A-phase coil group coils 91A2, B-phase coil group coils 92B2 and C-phase coil group coils 93C2, which are disposed in a predetermined order; the A-phase coils 91A1 of the upper coil group 60ABC and the A-phase coils 91A2 of the lower coil group 80ABC are magnetized in opposite directions. The same is true for the B-phase coils and the C-phase coils. The coil pitch Pc for each of the phases, which is to say the A-phase, B-phase and C phase, is twice the magnetic pole pitch Pm, corresponding to an electrical angle of $2\pi$. The A-phase coils 91A1 of the upper coil group 60ABC are disposed at a position which is shifted by $\pi$ relative to the A-phase coils 91A2 of the lower coil group 80ABC. The same is true for the B-phase coils and the C-phase coils. Note that the coils for the A-phase, the B-phase and the C-phase are disposed at positions that are successively shifted from each other by an electrical angle of π/3 each.

FIG. 18A shows the situation immediately before the phase is at 2π. The polarities of the A-phase coils 91A1 and 91A2 are inverted when the phase is at 2π. FIG. 18B shows the situation immediately before the phase is at π/3. The polarities of the C-phase coils 93C1 and 93C2 are inverted when the phase is at π/3. FIG. 18C shows the situation immediately before the phase is at 2π/3. The polarities of the B-phase coils 92B1 and 92B2 are inverted when the phase is at 2π/3.

Likewise in this relative drive device according to the sixth embodiment, the polarities (direction of magnetization) of the A-phase coils 91A1 and 91A2 are switched with a timing such that the polarities are switched when the magnets in the magnet group 70M face the coils in the A-phase coil groups 91A1 and 92A2. The same is true for the B-phase coil group and the C-phase coil group. Consequently, it is possible to generate driving force from all of the coil groups at all times, allowing a large amount of torque to be generated. Furthermore, by virtue of a construction wherein neither a magnetic material core nor a yoke is provided in any way, it is possible to realize a lightweight, high-efficiency relative drive device.

G. Variants

Note that the present invention is in no way limited to the examples and embodiments described above and can be embodied in various modes without departing from the scope or gist of the invention, wherein the following modifications are, for example, possible.

G1 Variant 1

In each of the relative drive devices described above, a magnetic shielding member may be provided at the exterior of the case. However, it is preferable that the magnetic shielding member does not function as a yoke for creating a magnetic circuit. Note that, in general, whether or not a member used in the relative drive device functions as a yoke can be determined by measuring the magnetic flux density of the magnet group and the coil group when that member is present and when that member is absent. For example, if the surface magnetic flux density of the magnet group and the coil group is increased by 10% or more when the magnetic shielding member is provided, this can be judged to be functioning as a yoke, while if this increase is less than 10%, it can be judged that the member is not functioning as a yoke. Note that, the criterion for this determination may be 5% instead of 10%.

G2 Variant 2

The relative drive device in the embodimentss described above serves to drive a drive shaft 1110 and a load shaft 1210 (FIG. 1) relative to each other, but it is possible to replace either one or both of the drive shaft and the load shaft with another type of driving force transmission member (such as a belt or a gear). For example, a belt groove may be provided at the external periphery of the first rotor unit 10 (FIG. 3B).

G3 Variant 3

The circuit structures used in the embodiments described above are only examples, and various circuit structures other than these can be adopted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A relative drive device for driving a first driving force transmission member and a second driving force transmission member relative to each other, the relative drive device comprising:
   first and second coil groups connected to the first driving force transmission member; and
   a magnet group connected to the second driving force transmission member,
   wherein the first and second coil groups each includes a plurality of electrically interconnected coils disposed along a predetermined direction at a predetermined pitch,
   the magnet group includes a plurality of magnets disposed with alternating north and south poles facing the first and second coil groups, and
   the first and second coil groups are disposed at positions that are out of phase with each other by an odd multiple of π/2 in electrical angles,
   the first driving force transmission member is connected to a prime mover by a drive shaft,
   the second driving force transmission member is connected to a load by a load shaft,
   the relative drive device is operable in any one of a plurality of operation modes including;
   (i) a relative acceleration mode in which the relative drive device transmits to the load via the load shaft a total of a first kinetic energy supplied from the prime mover through the drive shaft and a second kinetic energy that is converted from electric energy by the relative drive device; and
   (ii) a relative deceleration mode in which the relative drive device converts a part of the first kinetic energy to electric energy, and transmits to the load via the load shaft a residual of the first kinetic energy.

2. A relative drive device recited in claim 1, further comprising a case for housing the first and second coil groups and the magnet group,
   wherein each of the coils in the fist and second coil groups is wound around a support member formed from a substantially nonmagnetic and non-electroconductive material, and
   the case is formed from a substantially nonmagnetic and non-electroconductive material.

3. A relative drive device recited in claim 1, wherein
   structural members of the relative drive device, with exception of shafts and bearings, are formed from substantially nonmagnetic and non-electroconductive material.

4. A relative drive device recited in claim 1, wherein
   the plurality of coils in each coil group are interconnected in such a manner that adjacent coils belonging to the same coil group are always excited with mutually opposite polarities.

5. A relative drive device recited in claim 1, wherein
   the first and second coil groups are disposed on opposite sides of the magnet group so that the magnet group lies therebetween.

6. A relative drive device recited in claim 1, wherein
   the relative drive device is a rotary motor generator, in which the coil groups and the magnet group rotate relative to each other in accordance with the predetermined direction, and
   the number of coils in the first coil group, the number of coils in the second coil group, and the number of magnets in the magnet group are all equal.

7. A relative drive device recited in claim 1, further comprising:
- an internally housed drive circuit unit for controlling drive and regeneration of the first and second coil groups; and
- a brush contact provided on the first driving force transmission member for supplying electrical power, from exterior of the relative drive device, to the drive circuit unit by way of a brush, wherein the drive circuit unit including:
- a first drive control circuit for operating in a first operating mode by supplying first and second AC drive signals to the first and second coil groups so as to increase energy transmitted from one of the first and second driving force transmission members to the other of the first and second driving force transmission members; and
- a second drive control circuit for operating in a second operating mode by recovering electrical power generated by the first and second coil groups so as to reduce energy transmitted from one of the first and second driving force transmission members to the other of the first and second driving force transmission members.

8. A relative drive device recited in claim 7, wherein the drive control circuit unit further includes a communication unit for wirelessly receiving control commands from exterior of the relative drive device.

9. A relative drive device recited in claim 7, wherein the first drive control circuit generates the first and second AC drive signals such that polarities of each coil in the first and second coil groups are switched when center of each coil is opposite to one of centers of the magnets in the magnet group, and that magnetic flux density in each coil group reaches a maximum value when midway points between two adjacent coils in the coil group are opposite to the centers of the magnets in the magnet group.

10. A relative drive device recited in claim 9, wherein the first drive control circuit is capable of reversing an operating direction of the first and second coil groups and the magnet group, relative to each other, by reversing a current direction in the first and second coil groups.

11. A relative drive device recited in claim 7, wherein the first drive control circuit includes:
- first and second PWM circuits for generating first and second PWM signals, respectively, which are out of phase with each other by $\pi/2$; and
- a masking circuit for generating the first and second AC drive signals by masking the first and second PWM signals according to an output demand of the relative drive device.

12. A relative drive device recited in claim 11, wherein the masking circuit masks the PWM signals in temporal ranges that are symmetrically centered around a timing at which polarities of the AC drive signals are inverted.

13. A relative drive device recited in claim 1, further comprising:
- an adjustment mechanism for adjusting relative positions of the coil groups and the magnet group so as to weaken magnetic coupling between the coil groups and the magnet group in accordance with increases in relative speed between the first and second driving force transmission members.

14. A relative drive device recited in claim 13, wherein the adjustment mechanism increases a distance between the coil groups and the magnet group in accordance with increases in the relative speed between the first and second driving force transmission members.

15. A relative drive device recited in claim 1, wherein the first and second coil groups are disposed on first and second cylindrical members which form a hollow double cylinder structure, and the magnet group is disposed on a third cylindrical member which is inserted between the first and second cylindrical members.

\* \* \* \* \*

UNITED STATES PATENT AND TRADEMARK OFFICE
CERTIFICATE OF CORRECTION

PATENT NO. : 7,479,722 B2
APPLICATION NO. : 11/130693
DATED : January 20, 2009
INVENTOR(S) : Kesatoshi Takeuchi et al.

It is certified that error appears in the above-identified patent and that said Letters Patent is hereby corrected as shown below:

TITLE PAGE, Item (75) Inventors:, Lines 2 and 3, "3-5, Owa 3-chome, Suwa, Nagano (JP) 392-8502;" should be --Tokyo (JP);--

TITLE PAGE, Item (75) Inventors:, Line 3, "Kobufuji" should be --Nobufuji--

Column 1, Line 67, "2π/3in" should be --2π/3 in--

Column 7, Line 22, after "no" delete "a", first occurrence

Column 13, Line 27, "weekend" should be --weakened--

Column 15, Line 51, "embodimentss" should be --embodiments--

Column 16, Line 25, Claim 1, "including;" should be --including:--

Column 16, Line 40, Claim 2, "fist" should be --first--

Signed and Sealed this

Twenty-fourth Day of March, 2009

JOHN DOLL
*Acting Director of the United States Patent and Trademark Office*